United States Patent
Tribelhorn

(10) Patent No.: US 10,881,046 B2
(45) Date of Patent: Jan. 5, 2021

(54) AGRICULTURAL LIQUID FERTILIZER AND CHEMICAL DELIVERY SYSTEM AND METHOD OF USE

(71) Applicant: Agri-Inject, Inc., Yuma, CO (US)

(72) Inventor: Erik W. Tribelhorn, Yuma, CO (US)

(73) Assignee: Agri-Inject, Inc., Yuma, CO (US)

( * ) Notice: Subject to any disclaimer, the term of this patent is extended or adjusted under 35 U.S.C. 154(b) by 246 days.

(21) Appl. No.: 15/280,694

(22) Filed: Sep. 29, 2016

(65) Prior Publication Data

US 2017/0086363 A1   Mar. 30, 2017

Related U.S. Application Data

(60) Provisional application No. 62/234,291, filed on Sep. 29, 2015.

(51) Int. Cl.
| | | |
|---|---|---|
| *A01C 23/00* | (2006.01) | |
| *A01M 7/00* | (2006.01) | |
| *A01C 7/06* | (2006.01) | |

(52) U.S. Cl.
CPC ......... *A01C 23/007* (2013.01); *A01M 7/0089* (2013.01); *A01C 7/06* (2013.01)

(58) Field of Classification Search
CPC ...... A01C 23/007; A01C 7/06; A01M 7/0089; B05B 1/16

USPC .......................... 239/548, 550, 551
See application file for complete search history.

(56) References Cited

U.S. PATENT DOCUMENTS

| | | | | |
|---|---|---|---|---|
| 3,117,725 A | * | 1/1964 | Palmer .................. | A01M 7/006 239/168 |
| 4,545,244 A | * | 10/1985 | Yasuda .................. | G01F 1/663 73/195 |
| 7,360,413 B2 | * | 4/2008 | Jeffries ............... | G01M 3/2807 73/195 |
| 9,788,536 B1 | * | 10/2017 | Dixon .................. | A01M 7/0089 |
| 2014/0109644 A1 | * | 4/2014 | Carbone, II ........ | G01F 25/0007 73/1.16 |
| 2016/0136671 A1 | * | 5/2016 | Kocer .................. | A01C 23/007 700/283 |
| 2018/0263180 A1 | * | 9/2018 | Schlipf .................. | A01C 23/04 |

* cited by examiner

*Primary Examiner* — Jason J Boeckmann
(74) *Attorney, Agent, or Firm* — Talus Law Group LLC

(57) ABSTRACT

The present invention relates to a system that reliably, economically, and precisely delivers liquid fertilizer and chemicals during agricultural operations, such as during planting, tillage, and cultivating. The system includes a system of tubes delivering liquid to each row and a flow meter on each feed line to sense the flow rate and report the status of the flow to each row back to an operator's device.

22 Claims, 20 Drawing Sheets

AGRICULTURAL LIQUID FERTILIZER AND CHEMICAL DELIVERY SYSTEM AND METHOD OF USE

CROSS REFERENCE TO RELATED APPLICATIONS

This application claims the benefit of and priority under 35 U.S.C. § 119(e) to U.S. Provisional Patent Application Ser. No. 62/234,291 filed on Sep. 29, 2015, which is incorporated by reference herein in its entirety.

FIELD

Embodiments of the present invention are generally related to agricultural systems, and, in particular, to an apparatus and method for delivery of liquid fertilizer and chemicals during agricultural operations.

BACKGROUND

Existing systems to place fertilizer and/or chemicals into or onto soil during farming operations, comprising tillage, planting and cultivating, are limited and may be improved, as described in this disclosure.

By way of providing additional background, context, and to further satisfy the written description requirements of 35 U.S.C. § 112, the following references are incorporated by reference in their entireties:

U.S. Pat. No. 4,260,107 to Jackson discloses a hydrostatic spraying system with multiple spray booms for use with vehicles is especially suited for spraying agricultural treatment liquids such as fertilizers, herbicides, insecticides, trace minerals, etc. The system includes an operator-controllable variable displacement hydraulic pump driven by the vehicle, e.g., via its transfer case. A linear hydraulic motor is powered by the pump, being operated at a speed dependent upon a preselected output of the variable displacement pump and the rate of ground travel. Solenoid-controlled valving alternately supplies the hydraulic fluid to opposite ends of the linear motor for oscillating stroking operation of the motor. Twin linear hydraulic pumps interconnected with the linear motor each draw treatment liquid from a liquid supply tank and deliver treatment liquid under pressure in a precisely metered amount upon each stroke of the linear motor through corresponding operator-controlled diverter valves which are selectively operable to permit the metered amounts of treatment liquid to flow to respective spray booms or to be returned to the supply tank in a sparging line connection. The metered amounts delivered by each linear pump for delivery by the spray booms may be determined and totaled accurately by counters.

U.S. Pat. No. 7,455,010 to Cresswell et al., discloses a method for seeding flax seeds and canola seeds includes: with a plurality of side banding furrow openers, depositing seeds into a corresponding plurality of seed furrows; with each side banding furrow opener, depositing phosphate fertilizer in a corresponding side band in proximity to the seeds in the seed furrows; with a plurality of mid-row banding furrow openers, depositing nitrogen fertilizer, and optionally sulfur fertilizer, in fertilizer furrows where each fertilizer furrow is located substantially midway between adjacent seed furrows. An apparatus for practicing the method is provided as well.

U.S. Pat. No. 7,568,438 to Arksey discloses a disc furrow opener and method for single pass placement of seed and fertilizer in agricultural planting uses a scraper to both scrape the disc and form a seed shelf in the furrow formed thereby and delivers seed onto the seed shelf and fertilizer into a bottom portion of the open furrow formed by the disc below the seed shelf. Placement of seed and fertilizer is achievable in a single pass over the area to be seeded without need for a second opening implement rearward of the disc and without being limited to the use of liquid fertilizer.

U.S. Pat. No. 8,205,566 to Martin discloses a method and apparatus to be mounted upon a planter row unit for delivering liquid fertilizer to the bottom of a trench without contacting the seed to be planted may be integrated with a cleaner for the furrow opening device. The system as claimed and described is adapted for mounting to substantially all modem row units employing floating row units. The method and apparatus as described does not interfere with existing down pressure or seed placement systems as found on modern row crop planters. As described and implemented, the method and apparatus is more compact and lighter in weight than the prior art. The assembly for a seed planting unit works in combination with a seed trench opener to form a trench for the deposit of liquid fertilizer offset from and parallel to the later formed seed trench.

U.S. Pat. No. 9,003,983 to Roth et al., discloses a no-till apparatus for application of herbicide and fertilizer, soil preparation, and seeding of a cover crop in a standing crop has inter-row assemblies configured to pass along inter-row areas between adjacent row lines of standing crop plants. Each assembly includes a fertilizer applicator, a no-till soil preparation element, a cover crop seed applicator, and a postseeding element.

U.S. Pat. No. 9,113,591 to Shivak discloses metering devices for an agricultural implement for applying a field input, for example, pneumatically delivering granular product including seed or fertilizer or sprayed liquid product including fertilizer and the like, to an agricultural field. In the applying of the field input, the rate of application of the dispensers of one section of the implement can be collectively varied in relation to the rate of application of the dispensers of a different section of the implement frame; and WIPO Patent Application WO/2012/011797 to Mohammad discloses a piezoelectric-based-energy harvester apparatus consisting of a specially designed mechanical structure, hollow cylindrical structure with a piezoelectric cantilever bridge within its chamber, that upon exposure to the collected rain water incoming from the roof structure into the post, will move or vibrate due to buoyant force of the strategically trapped rain water. With the structure built-in mechanical cantilevers bridge that has piezoelectric properties, the vibration of the cylindrical structure is followed by the generation of micro energy. Therefore, besides serving its traditional purpose for protection, the post/pillar can also be used to produce energy which can power up low power electronic devices such as for precision agriculture application. This apparatus can also act as an alternative-energy harvester during raining season where no sunlight is available.

SUMMARY

It is one aspect of embodiments of the present invention to provide a system to reliably, economically, and precisely deliver liquid fertilizer and chemicals during agricultural operations, such as during planting, tillage and cultivating.

It is another aspect of embodiments of the invention to provide a fertilizer or chemical distribution system that operates properly row after row with little input, work, and adjustments. It is one aspect of embodiments of the invention to provide a fertilizer or chemical distribution system that is accurate, effective, and easy to use, which results in greater yield, lower operating costs, and less time applying fertilizers or chemicals.

It is a further aspect of embodiments of the invention to provide a fertilizer or chemical distribution system that delivers precise amounts of liquid fertilizer or other crop chemicals directly where it is most needed and where it will provide the most benefit. In some embodiments, the system is mounted directly on an implement and pumps a uniform stream of liquid through a network of very small plastic tubes. In other embodiments, the system is mounted on a planter and the delivery ends of the micro-tubes are attached to the planter shanks, trailing down the furrow dust behind the seed tubes. In other embodiments, the system is mounted on a cultivator and the chemical is placed near the plant for direct uptake. In alternative embodiments, the system is mounted on tillage equipment and the tubes are usually attached to the sweeps for a broadcast effect.

In one embodiment, the fertilizer or chemical distribution system uses micro-tubes to deliver liquid product. A system of micro-tubes has three distinct advantages over systems that employ spray nozzles or orifices to apply chemicals. First, liquids flow freely through the micro-tubes. The flow rate is regulated by the diameter of the tube, rather than by restriction of the nozzle opening or orifice. Chances of clogging or blockage, are greatly reduced with the micro-tube system. Valves can also be added to the micro-tube system to prevent flow on certain rows. Second, flow from the tubes can be easily directed to the exact spot where the farmer wants the product. With the precise placement of the micro-tube system, there is no drift or loss of product as there is with nozzle applications. Moreover, application rates can be exchanged with the flick of the wrist or touch of a button, rather than having to adjust each nozzle individually. Third, the system is customized to each individual implement and micro-tubes are sized so that the same amount of solution is delivered to each row, whether it be in the center or on the outer edges.

It is another aspect of the invention to provide an agricultural liquid and chemical delivery system and method that is more accurate than systems and methods of the prior art. The present system delivers precise amounts of liquid solution exactly where the user wants it. The system also has controlled flow, which allows the user to apply precise amounts for consistent results. Some embodiments use micro-tubes, which can easily be directed to deliver chemicals exactly where the user wants them. Placing fertilizer or chemical in the furrow with the seed provides complete coverage.

It is one aspect of embodiments to provide a fertilizer or chemical distribution system that the user can control from the tractor cab. Thus, the system includes controls and a user interface to allow the user to control the flow pump and sensor/control unit to regulate the amount of liquid flowing through the tubes.

It is one aspect of embodiments of the invention to provide a fertilizer and chemical delivery system and method with a novel manifold assembly (the network of hoses, tubes, and fittings that carry liquid product from the pump and deliver the liquid to the desired location) that is more efficient than existing manifold assemblies used in agricultural systems. It is another aspect of embodiments of the invention to provide a fertilizer and chemical delivery system that is easy to mount on any equipment and provides for quick and easy repairs and part replacements. In some embodiments the system includes flexible tubing and quick-connect fittings that make it easy to fabricate the manifold system calculated specifically for the user's machinery. In various embodiments, the components are made of rugged, chemical-resistant materials for long life and low maintenance. Proper sizing delivers consistent amounts of liquid across the width of the implement. In some embodiments, tubing can be routed directly through the hollow steel frame or be attached to the structure with nylon tie-downs.

It is another aspect of embodiments of the invention to provide a fertilizer and chemical delivery system that provides precise placement of solutions into the furrow.

In some embodiments, a 12-volt rheostat controller is mounted in the tractor cab and makes variable speed control for the pump as simple as turning a dial. In other embodiments, the pump is controlled via an iPad or tablet user interface. The accuracy of the system starts with the pump. A constant pressure at the point where liquids are introduced into the network of plastic tubes results in precise control of the amount of liquid flowing from the delivery end of the system.

It is another aspect of embodiments of the invention to provide a fertilizer and chemical delivery system that provides a constant, consistent flow of liquid through the system for uniform application. In some embodiments, the flow rates of one or more tubes can be monitored and adjusted on-the-go to assure accuracy. Use of an optional flow sensor and/or flow meter lets the user monitor just how their system is performing. The flow sensor and flow meter provide accurate flow measurement regardless of outdoor temperature or chemical viscosity. The flow sensor can be used without a controller to monitor flow.

Some embodiments of the present invention include wireless sensors and communication devices to increase control and efficiency in the user's farming operation. In one embodiment, the flow sensor is an industrial grade flow sensor designed to measure flow of agricultural fertilizers and chemicals. In one embodiment, the sensor is an ultrasonic sensor that accurately senses flow in nearly any agricultural liquid without any part of the sensing technology touching the liquid. In other embodiments, the sensor can use a magmeter, infrared, turbulence detection, or a paddle wheel, or other known flow sensing mechanisms. In some embodiments, a rugged, wireless, battery-powered sensor is designed to measure the flow of the user's liquid delivery system on the user's planter and to deliver a precise flow reading per row directly to the user's Bluetooth-enabled device (e.g., iPad, tablet, smart phone, etc.) in the tractor cab.

Some embodiments also include an industrial-grade pressure sensor designed to monitor pressure and deliver a reading on-demand or provide an instant alert if the pressure is outside a user-defined range.

Various embodiments include an industrial-grade control valve designed to adjust the flow of liquid in a tube to achieve a user-defined flow set-point. In embodiments where the control valve is combined with flow sensors and programmed via a mobile app, the valve can intentionally vary the rate of flow in a system based on a variety of inputs such as GPS position, speed, manual over-ride, and more.

Some embodiments of the present invention include a robust control application designed to run on any tablet or smartphone. The control application is simple to setup and connect with any of the system's other wireless sensors via Bluetooth connectivity. The control application has intuitive screens that provide a quick understanding of the status of the system, as well as obvious and noticeable alerts based on user-defined limits. When the control application is combined with additional command technology, the control application will respond to GPS location and monitor and control the flow of agricultural liquids based on prescription application data using the flow sensors, pressure sensors, and control valves. The control application does all of this with rugged, quick valves and a simple, farmer-friendly user interface. Additionally, the wireless system frees users from the ever growing tangle of wires.

It is another aspect of the invention to provide an agricultural liquid and chemical delivery system and method that is safer and more environmentally friendly than systems and methods of the prior art. Embodiments of the present system reduce operator exposure and chemical drift. Additionally, the easy-to-fill tanks minimize the handling of chemicals. Some embodiments do not include nozzles or orifices, which typically have to be adjusted and unclogged periodically, so the operator's exposure to chemicals is largely reduced. In some embodiments, the chemical solution is placed directly into the furrow, resulting in practically no possibility of chemical drift. Additionally, because the product is placed underground, the danger to wildlife is greatly reduced.

It is another aspect of the invention to provide an agricultural liquid and chemical delivery system and method that is more effective than systems and methods of the prior art. Planting-time chemical or fertilizer application puts the chemicals or fertilizer right where it is needed the most during crop germination and critical early development. In various embodiments, every seed and every row gets the same chemical or fertilizer application, to ensure consistent results.

It is another aspect of the invention to provide an agricultural liquid and chemical delivery system and method that is more easy to use than systems and methods of the prior art. In some embodiments of the present invention, the operator may monitor and control the various flow rates from his/her tractor seat. The operator must simply fill the supply tanks, start the system, and proceed with planting, tillage, or cultivation. Embodiments with a cab-mounted controller unit allow the tractor driver to monitor and adjust the solution flow to all rows at the same time or to individual rows while on the go. For example, the tractor driver can use the controller to set the fluid flow to certain rows at one level while the fluid flow to other rows is set at a different level.

It is another aspect of the invention to provide an agricultural liquid and chemical delivery system and method that has lower operating costs than systems and methods of the prior art. Embodiments of the present invention allow for direct placement of the chemicals, which saves chemicals and means no wasted chemicals, thus providing savings on chemical costs. Additionally, a one-step application reduces and eliminates costly trips across the field, thus reducing soil compaction and wear and tear on equipment. Additionally, embodiments of the present invention are low maintenance compared to existing spray systems and there are no nozzles to unclog or parts to replace.

Examples of fertilizers and chemicals used with embodiments of the present invention include starter fertilizers, herbicides, fungicides, insecticides, or other liquid chemicals.

In one embodiment, an agricultural liquid delivery system is provided comprising: a tank; a manifold in fluid communication with the tank; piping interconnecting the tank to the manifold; two or more tubes interconnected to the manifold, wherein each tube has an outlet to deliver the agricultural liquid to seeds or crops; a communication network; a plurality of flow meters, wherein each tube is interconnected to a flow meter, and wherein each flow meter comprises a flow sensor, an outer housing, a power source, a processor, and a communication interface to connect to the communication network; and a controller comprising a display, a graphical user interface, a processor, a power source, memory, and a communication interface to connect to the communication network, wherein each flow meter senses fluid flow through its corresponding tube and sends fluid flow information to the controller over the communication network. The flow meters may also include an inlet, an outlet, and a fluid through hole such that the flow meter is interconnected to the tube at the inlet, outlet, or both the inlet and outlet and fluid can flow in the inlet, through the fluid through hole, and out the outlet. The flow sensor can be placed in the fluid flow or proximate to the fluid flow to sense the flow rate and/or fluid pressure. In additional embodiments, the system can include a mixer, a pump, a plurality of valves, and a pressure sensor. In some embodiments, each flow meter does not include a power source; rather the system includes one power source that provides power to all flow meters.

In one embodiment, a method of monitoring agricultural liquids delivered to crops or seeds is provided comprising: providing: two or more tubes, wherein each tube has an outlet to deliver the agricultural liquids to seeds or crops; a communication network; a plurality of flow meters, wherein each flow meter comprises an inlet, an outlet, a flow through hole, a flow sensor, an outer housing, a power source, a processor, and a communication interface to connect to the communication network; and a controller comprising a display, a graphical user interface, a processor, a power source, memory, and a communication interface to connect to the communication network; interconnecting each tube to a flow meter in the plurality of flow meters; sensing a flow of the agricultural liquids through each flow meter; sending fluid flow information to the controller over the communication network; and displaying the fluid flow information on the display of the controller.

In one embodiment a tangible and non-transient computer readable medium is provided comprising microprocessor executable instructions that, when executed, perform steps comprising: receiving fluid flow information from a flow sensor; and sending the fluid flow information to a controller.

The present disclosure can provide a number of advantages depending on the particular aspect, embodiment, and/or configuration.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation.

Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine," "calculate," and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein are used interchangeably and include any type of methodology, process, mathematical operation or technique.

The preceding is a simplified summary of the disclosure to provide an understanding of some aspects of the disclosure. This Summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

The Detailed Description, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

Figure 1:
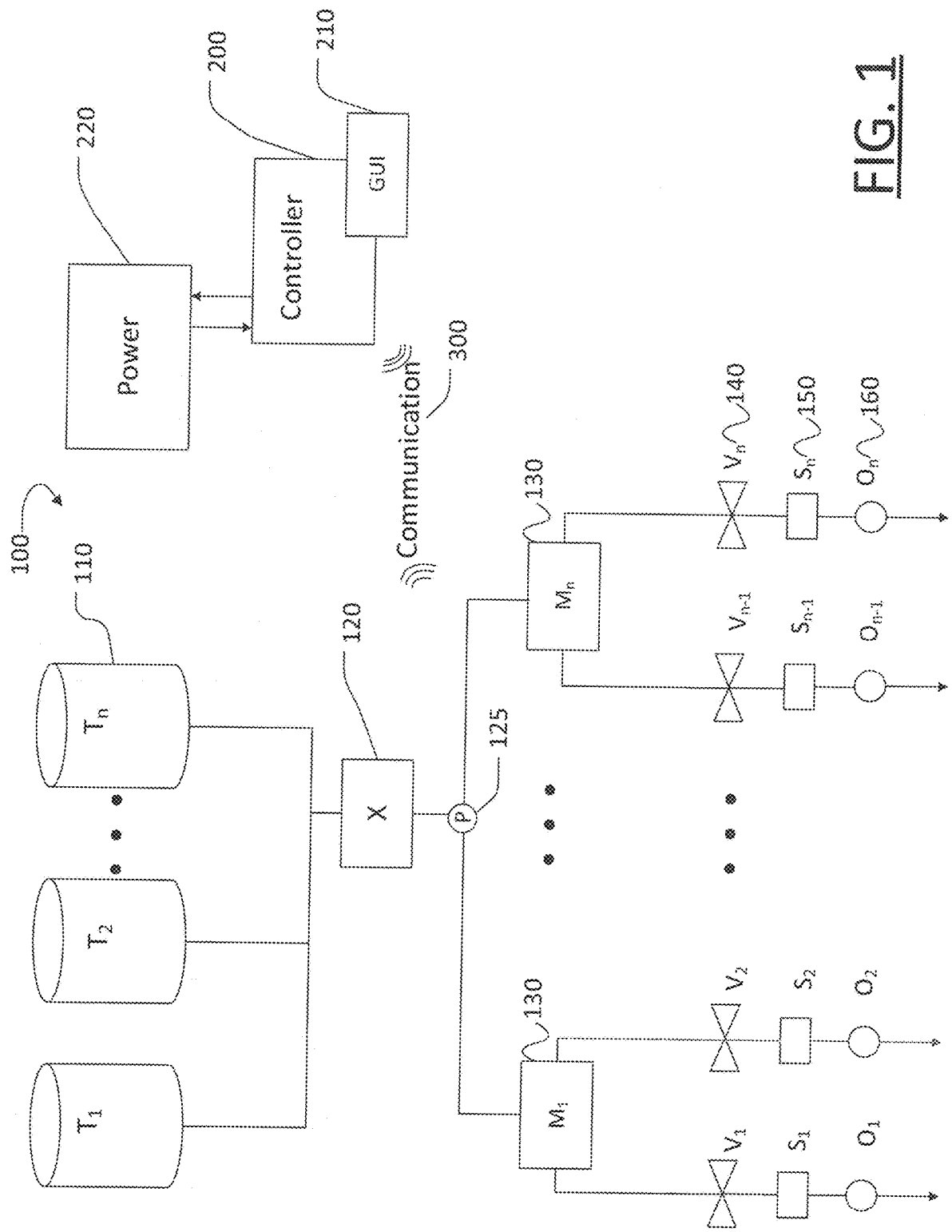
FIG. 1 depicts a block diagram of the system according to one embodiment of present invention.

To assist in the understanding of the embodiments of the present invention, the following list of components and associated numbering found in the drawings is provided herein:

| Reference No. | Component Name |
|---|---|
| 100 | System |
| 110 | Tank |
| $T_n$ | Tank n |
| 120 | Mixer |
| 125 | Pump |
| 130 | Manifold |
| $M_n$ | Manifold n |
| 135 | Tubing/Feed Line |
| 140 | Valve |
| $V_n$ | Valve n |
| 150 | Flow Meter |
| $S_n$ | Flow Meter n |
| 160 | Flow Outlet |
| $O_n$ | Flow Outlet n |
| 170 | Tubing System |
| 175 | Press Wheel or Seed Firmer |
| 180 | Double Disk Opener |
| 200 | Controller |
| 210 | GUI |
| 220 | Power Source |
| 300 | Communication |
| 400 | Flow Meter |
| 402 | Flow direction |

| Reference No. | Component Name |
| --- | --- |
| 404 | Top Cover |
| 408 | Lid |
| 412 | Threaded Portion |
| 416 | Connector |
| 420 | End where flow enters |
| 424 | End where flow exits |
| 428 | Pipe Stem Portion |
| 432 | Bottom Cover |
| 436 | Apertures |
| 450 | Female End |
| 454 | Male End |
| 458 | Push-fit Stem |
| 504 | Flow Openings |
| 508 | Housing Interconnection Location |
| 512 | Apertures for Housing |
| 516 | Upwardly Extending Members |
| 520 | Through Hole |
| 524 | Slots |
| 528 | Corner Supports |
| 532 | Interior Perimeter Wall |
| 536 | Inner Edge |
| 550 | Housing |
| 554 | Gasket |
| 558 | Aperture |
| 562 | Extension Portion |
| 566 | Round Portion |
| 570 | Fluid Flow Path |
| 574 | Cavity of Extension Portion |
| 600 | Perimeter Wall |
| 604 | Upper End of Holder |
| 608 | Lower End of Holder |
| 612 | Groove |
| 654 | Arm |
| 658 | Raised Portions |
| 662 | Perimeter Wall |
| 666 | Upper Surface |
| 670 | Outer Perimeter Edge |
| 800 | Gasket |
| 804 | Arm |
| 900 | Gasket |
| 904 | Upwardly Extending Portions |
| 908 | Aperture |
| 1004 | Bar |
| 1008 | No Signal Indicator |
| 1012 | No Flow Bar (e.g., yellow bar) |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-12 show various embodiments of the apparatus and method for delivery of liquid fertilizer and chemicals during agricultural operations.

With focus on FIG. 1, a block diagram of one embodiment of the agricultural liquid fertilizer and chemical delivery system 100 is presented. Tanks 110 may hold fertilizers and/or chemicals appropriate for the farming operation. (All subscripts "n" indicate one or more elements, e.g., $T_n$ indicates tanks 110 numbering 1 through n, where n may be 1 or any integer equal or greater than 1.) The addition of a second, optional tank allows application of small amounts of herbicide, insecticide, or fungicide along with the fertilizer. The mixer 120 combines or mixes liquid inputs from tanks 110. Mixed liquid then flows to manifold 130 and to one or more valves 140 and flow meters 150 with flow sensors prior to emission at outlets 160. The flow meters 150 include flow sensors that measure flow parameters comprising rate, pressure, and volume. The flow meters 150 can report back to a controller 200 the flow sensed by the flow sensor. Thus, the flow sensors would be positioned on the flow line proximate to the flow meters 150. Control of the liquid flow is provided via the controller 200, as powered by the power source 220 and as manipulated by a user through GUI (graphical user interface) 210. The power source 220 may power elements comprising flow meters 150, sensors, valves 140, and the controller 200. In some embodiments, the power source 220 only powers the controller 200 and each flow meter 150 or other device has its own power source. The communication 300 enables communication between elements comprising, for example, valves 140, flow meters 150, and a controller 200.

The tanks 110 are fitted to a piece of agricultural equipment, and may be commercially-available drums or cylinders. The mixer 120 may comprise an agitating component to ensure complete and/or uniform mixing of the fluid inputs. Manifolds 130 split an incoming fluid line into a multitude of lines to fit to the agricultural implement. For example, the manifold 130 may split the incoming line into eight, ten or twelve lines. The novel manifold 130 allows the fluid to travel straight to a junction point, upon reaching that point, the fluid is then dispersed evenly through all manifold outlets. This insures equal dispersion of fluids through all micro-tubes.

Alternatively, the valves 140 may be combined with flow meters 150 into one component. Valves 140 may be fitted downstream of flow meters 150. In one embodiment, the flow meter 150 is fitted approximately eight to ten feet upstream of the outlet 160. The valve 140 and/or meter 150 may be controlled by the controller 200. In one embodiment, one or more valves 140 are adjusted as a function of the measurements of one or more flow meter 150.

The tanks 110 come in a variety of sizes and configurations with different rack-sizes and base-sizes depending on tank 110 and pump 125 selection. A tank mixer 120 is also available for proper agitation of chemical or liquid. In some embodiments, the system 100 includes a static mixer for the application of more than one liquid.

Embodiments of the system 100 include pumps 125 with a 12-volt configuration or other known configurations. The type and size of the pump 125 varies for different embodiments because each system is designed to meet different operating criteria. Thus, the pump 125 can range from 1.0 to 9.0 gallons per minute. The system 100 can also be configured to use existing ground-driven or hydraulic pumps. Moreover, the location of the pump 125 can vary in different embodiments. For example, the pump 125 can be positioned after the tanks 110, but before the mixer 120 or the pump can be positioned after the mixer 120 but before the manifolds 130. Additionally, more than one pump can be used and the various pumps 125 can be placed at different locations throughout the system 100.

The controller 200 may be automatic or semi-automatic, and may be manipulated or selected by a user via the GUI 210. Communication 300 between the controller 200 and one or more valves 140 and/or flow meters 150 may be by any means known in the art, to include RF, Bluetooth, and conventional hard-wiring. The power source 220 may be any means known to one skilled in the art, and includes solar, wind, hydrocarbon, natural gas, batteries, and vibration energy (e.g., as detailed herein). In one embodiment, the controller 200 and/or GUI 210 is an iPad or other tablet device. The controller 200 may control flow rate and or pressure through one or more valves 140 and/or flow meters 150 (to include stoppage of flow), manifold 130 settings, and mixing through the mixer 120. As such, flow through outlets 160 may be variable through a given outlet 160 and/or may be varied with location of outlet, e.g., every other outlet 160 at a first rate and the remaining outlets 160 at a second rate. The controller 200 may adjust flow rate through one or more flow meters 150 and/or to one or more outlets 160 with input from other sensors, e.g., soil moisture sensors, and/or as influenced by other data, e.g., soil fertility maps.

Figure 2A:
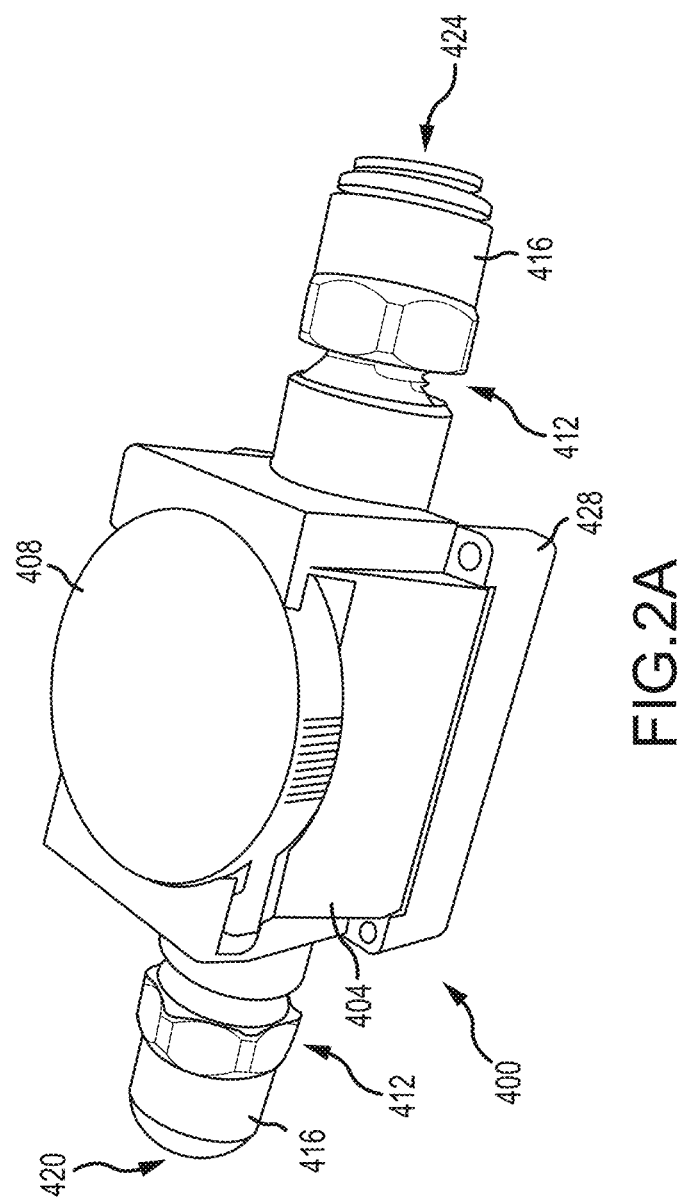
FIGS. 2A-C show one embodiment of a threaded flow meter.
Figure 2B:
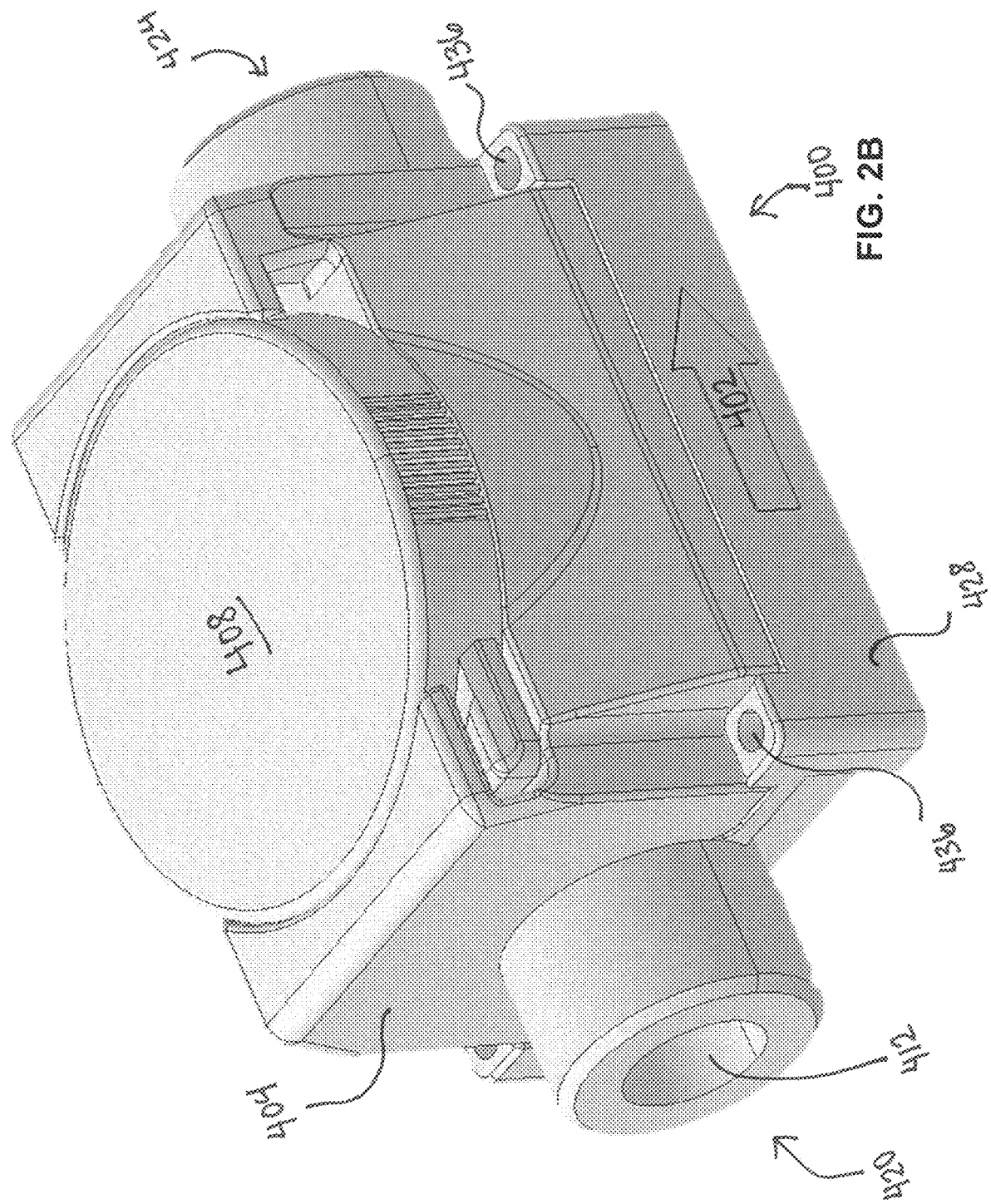
Figure 2C:
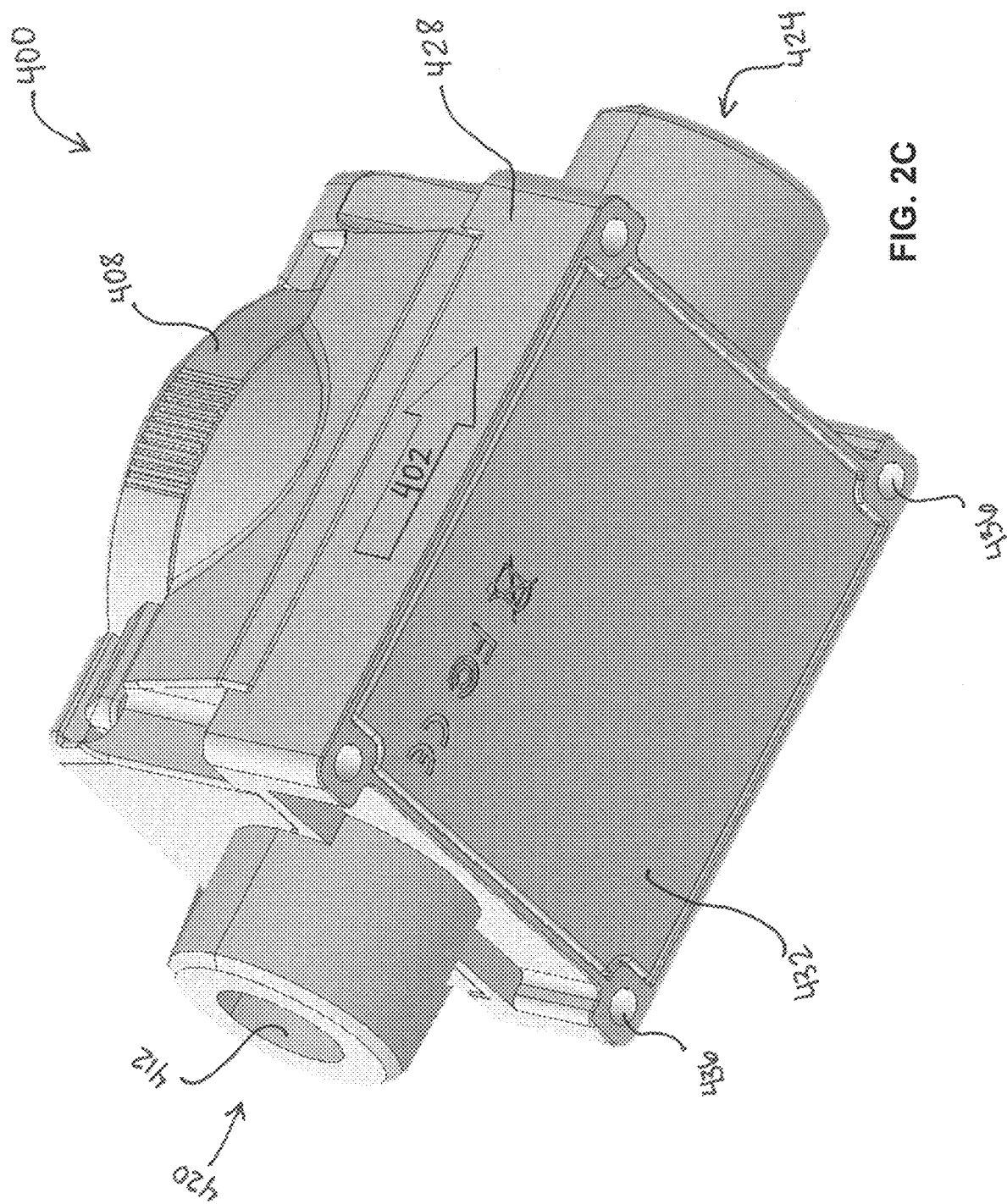

FIGS. 2A-C show one embodiment of a threaded flow meter. The flow meter 400 includes a pipe stem portion 428 with a threaded portion 412 and apertures 436, a top cover 404, a lid 408, connectors 416, and a bottom cover 432 with. The flow of the liquid fertilizer or chemical enters the flow meter 400 at one end 420 and exits the flow meter 400 at the other end 424. The flow direction is indicated by arrow 402. The tubes of the system are interconnected to the connectors 416 such that one tube (which can be a micro tube) is interconnected to one connector 416 on one end 420 where the fluid enters and another tube (which can be a micro tube) is interconnected to the connector 416 on the other end 424 where fluid exits. In some embodiments, each feed line terminating with an outlet for the fluid to exit and be distributed on the crops or seeds has a flow meter; therefore, each feed line terminating with an outlet has a pipe stem portion 428 somewhere along the line.

Figure 3A:
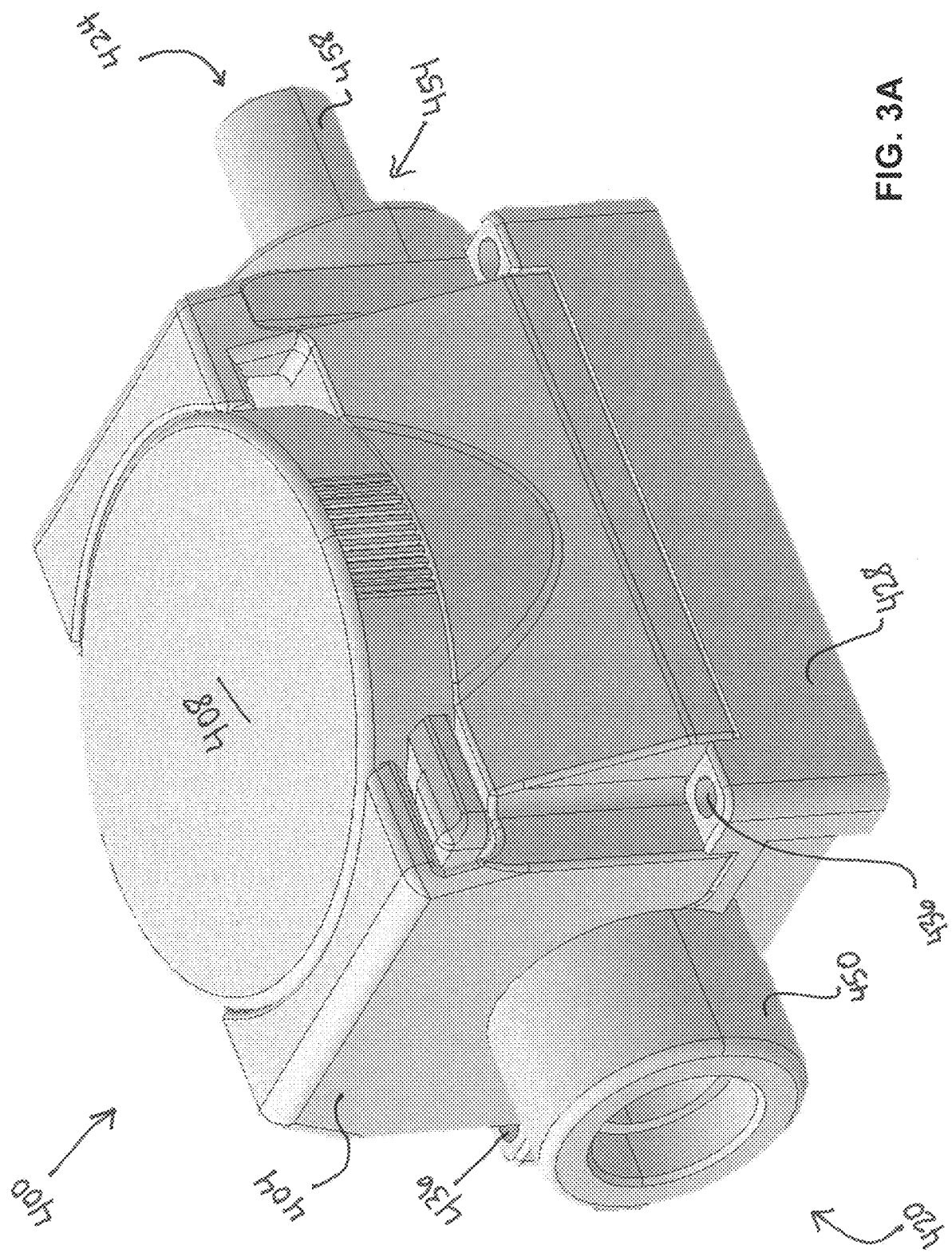
FIGS. 3A-B show one embodiment of a stem flow meter.
Figure 3B:
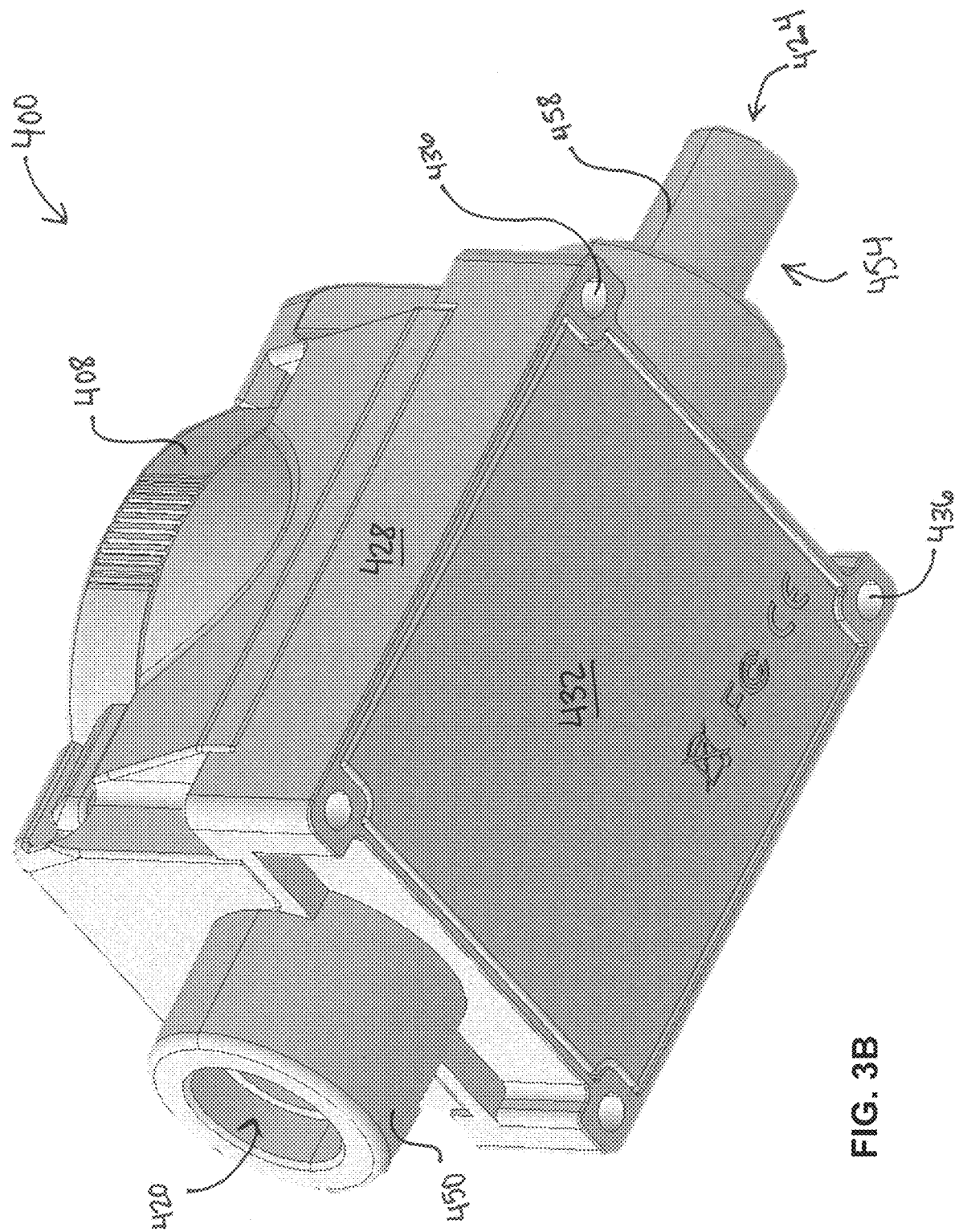

FIGS. 3A-B show one embodiment of a stem flow meter 400. The flow meter 400 includes a pipe stem portion 428 with apertures 436, a female end 450 with a push-fit insert, and a male end 454 with a push-fit stem 458, a top cover 404, a lid 408, connectors 416, and a bottom cover 432 with. The flow of the liquid fertilizer or chemical enters the flow meter 400 at one end 420 and exits the flow meter 400 at the other end 424. The flow direction is indicated by arrow 402.

Figure 3C:
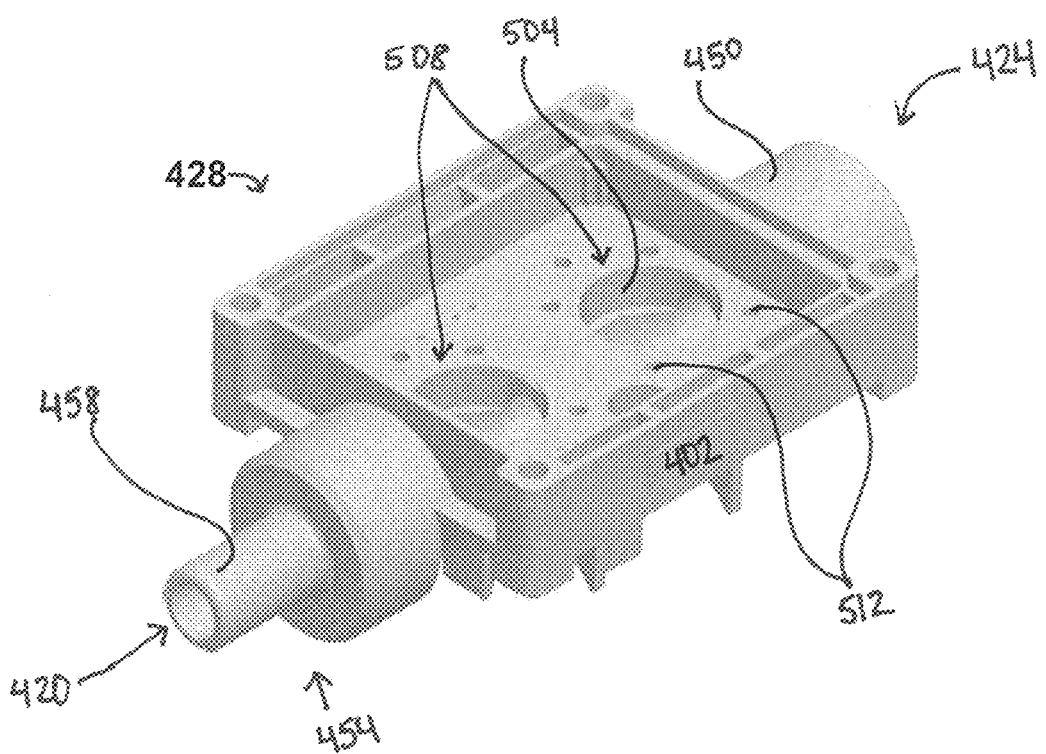
FIG. 3C shows one embodiment of a pipe stem portion.

FIG. 3C is a bottom perspective view of a pipe stem portion 428 for the stem flow meter of FIGS. 3A-B. The male 454 and female 450 ends can be seen in FIG. 3C. The male end 454 has a push-fit stem 458. This view shows the bottom side of the pipe stem portion 428. The bottom portion includes flow openings 504 through which the fluid flows. Fluid flows the direction of arrow 402 and flows in the inlet 420 (the male end 454 in this embodiment), through the flow openings 504, and out the outlet 424 (here, the female end 450). Two housings (FIGS. 5A-C) are interconnected to the pipe stem portion 428 at the housing interconnection portions 508 to close off the flow openings 508. The housing is interconnected to the pipe stem portion 428 via fastening devices (e.g., bolts, screws, etc.) positioned through the apertures 512.

In one embodiment, the flow meter 400 comprises an ultrasonic flow meter and is devoid of mechanical flow meters. The flow meter has the outer housing components shown in FIGS. 2A-C and 3A-B and includes the sensing and communication components and/or interface inside of the outer housing. The flow meter 400 comprises an outer housing positioned around a circuit board with a processor, software, communication components and/or interface, flow tube sensors in the flow through path, and a power source (e.g., battery). In one embodiment, the flow meter 400 has its own battery such that wires are not needed to power the flow meter 400. However, wires to charge the battery could be positioned or embedded in the plastic tubes to avoid additional wires. In other embodiments, each flow meter does not include a power source; rather the system includes one power source that provides power to all flow meters. The advantage of the present invention is that the operator can see in real-time the amount of fluid flowing to each row of crops or seeds because the flow meter senses the fluid flow and reports back to the command application where the operator can see the flow on the GUI. Previous systems only sensed the whole field (not each row) and did not include wireless flow meters. The flow meters 400 of the present invention are wireless and each feed tube has a flow meter such that each row of crops or seeds can be sensed. Additionally, the flow meters 400 of the present invention may be battery-powered so they run on their own power and do not need cables or wires to power the flow meters. In some embodiments, the batteries are rechargeable using solar power or vibration power such that the operator does not have to change the batteries. In other embodiments, the batteries are not rechargeable so the operator must change the batteries when prompted by the command application. The flow meters 400 include communication components and/or interface to wirelessly (e.g., via Bluetooth) report the flow rate, status, battery status, etc. back to the command application, which is housed on a smart phone or tablet in the tractor cab. Additionally, some embodiments the flow meter 400 includes an electrical connection to output a pulse signal for wired systems. The electrical connection is interconnected to the same connector interconnected to the battery or other power source.

In one embodiment, the flow meter includes a flow sensor and a wireless communication device and/or interface to connect to a communication network and to send the flow information to the operator's tablet, smart phone, or other computing device. The flow meter can include a processor, which can be any processor capable of performing instructions encoded in software or firmware. Further, the processor can be provided to execute instructions contained within the memory and/or data storage. The processor can comprise a controller or application specific integrated circuit (ASIC) having or capable of performing instructions encoded in logic circuits. The memory may be used to store programs or data, including data comprising content. As examples, the memory may comprise RAM, SDRAM, or other solid state memory. Alternatively or in addition, data storage may be provided in the flow meter and/or in the tablet, smart phone, computer, etc. The data storage may generally include storage for programs and data.

In various embodiments, the flow meter can also receive data and instructions from the command application on the user's device (e.g., tablet, smart phone, computer). Communication may be over any known wireless means, such as Bluetooth, near field communication (NFC), etc.

Figure 4A:
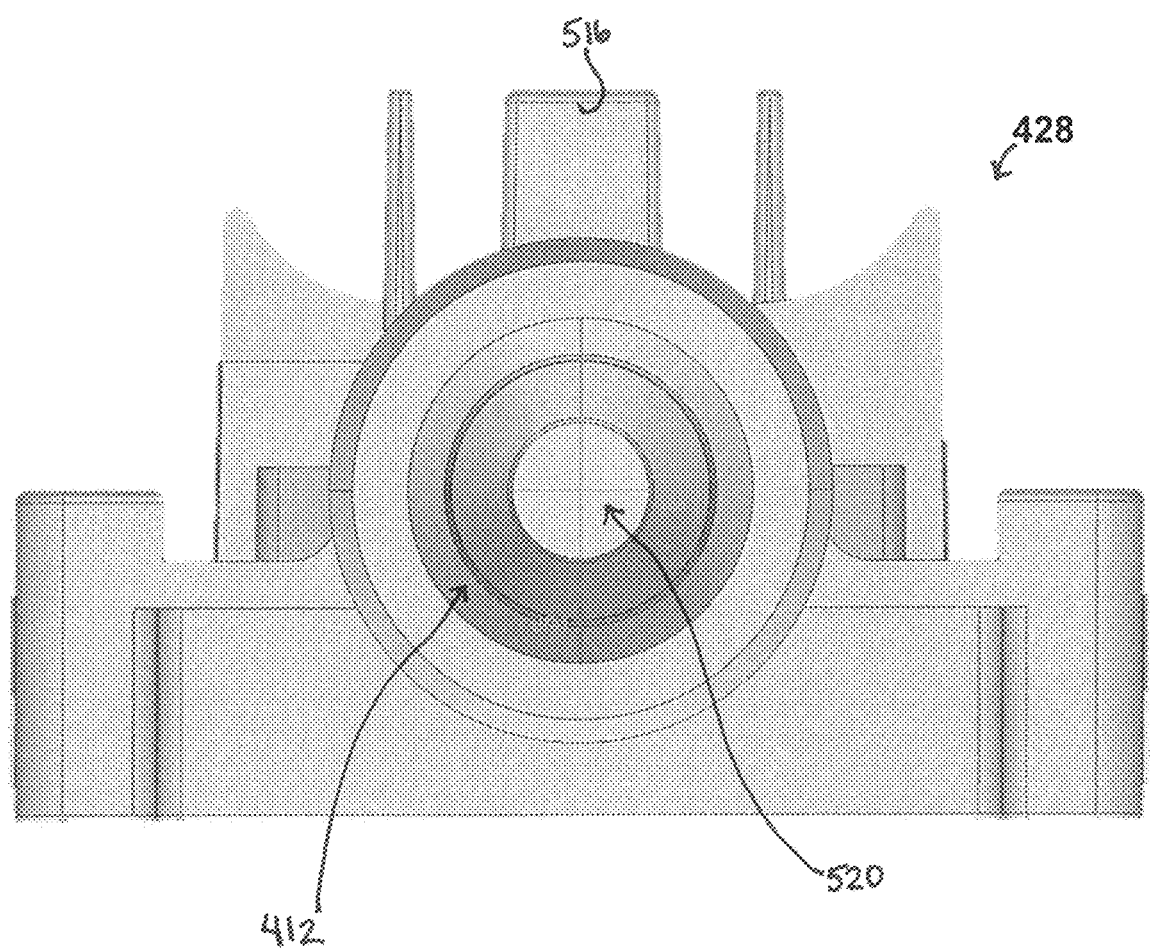
FIGS. 4A-D are different views of a pipe stem portion.
Figure 4B:
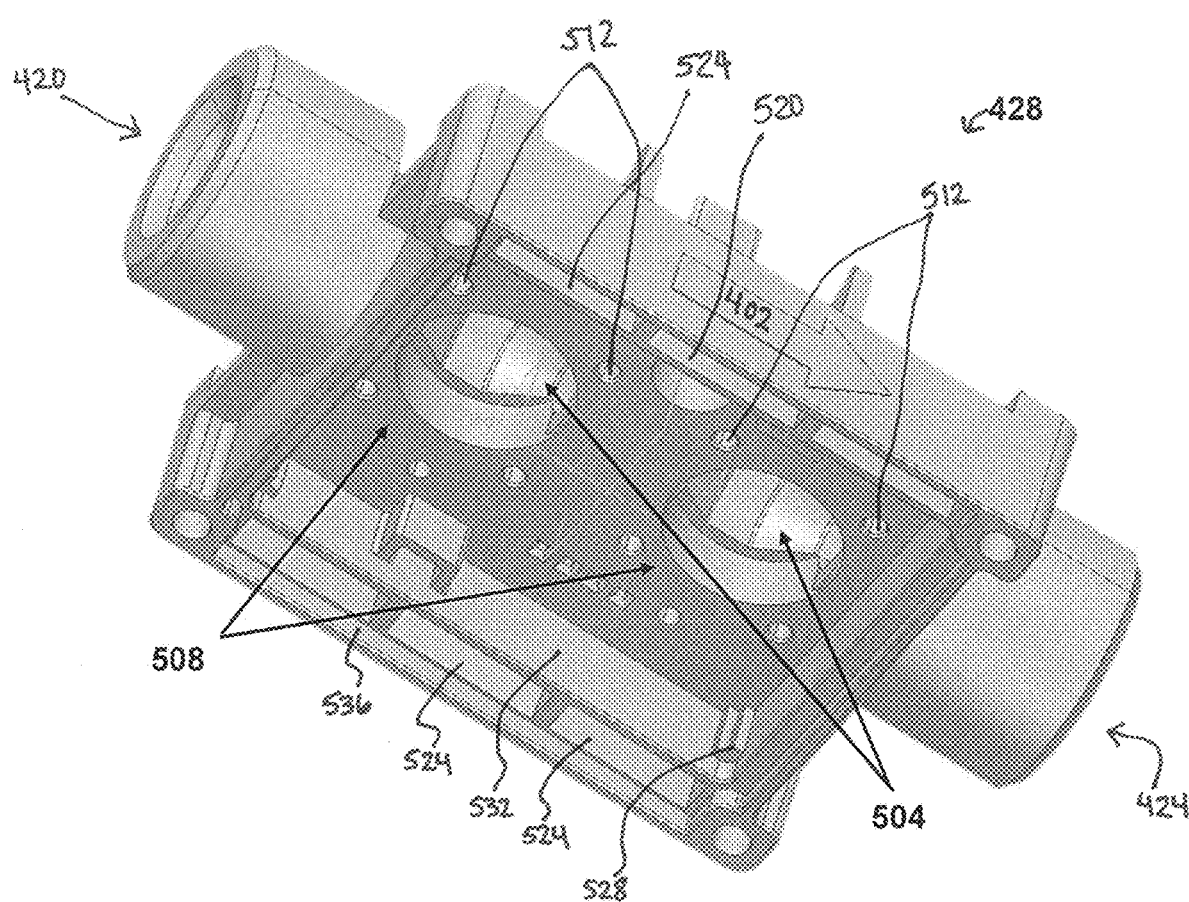
Figure 4C:
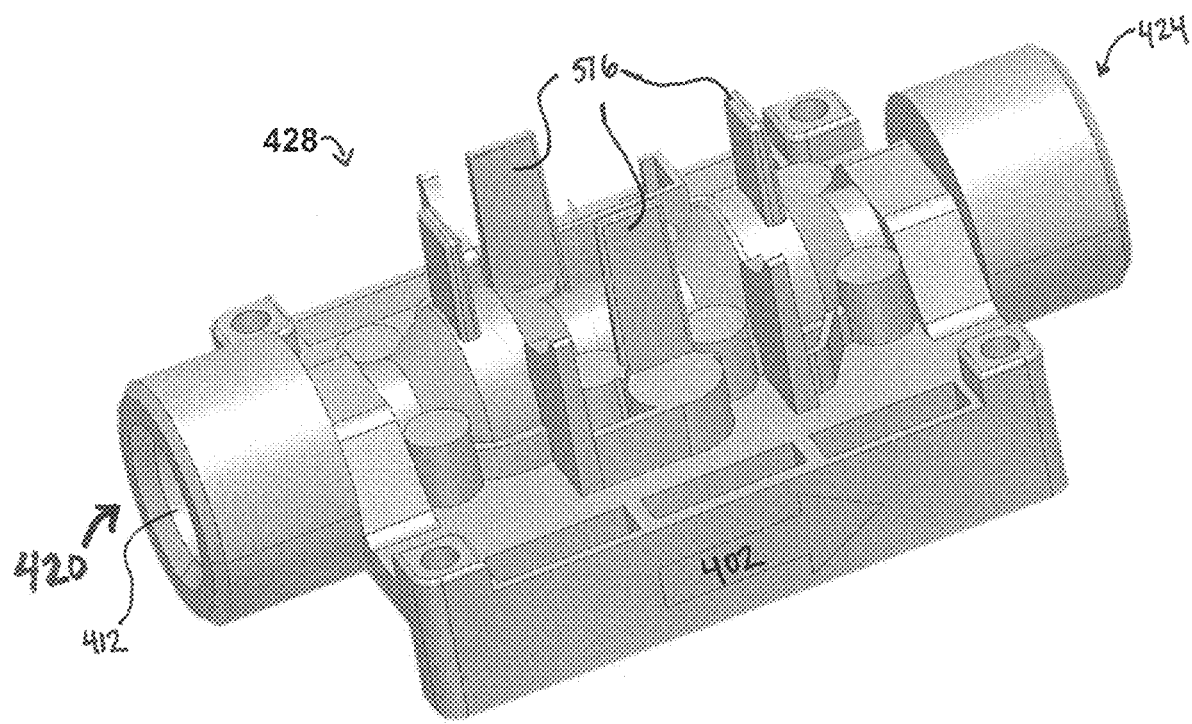
Figure 7:
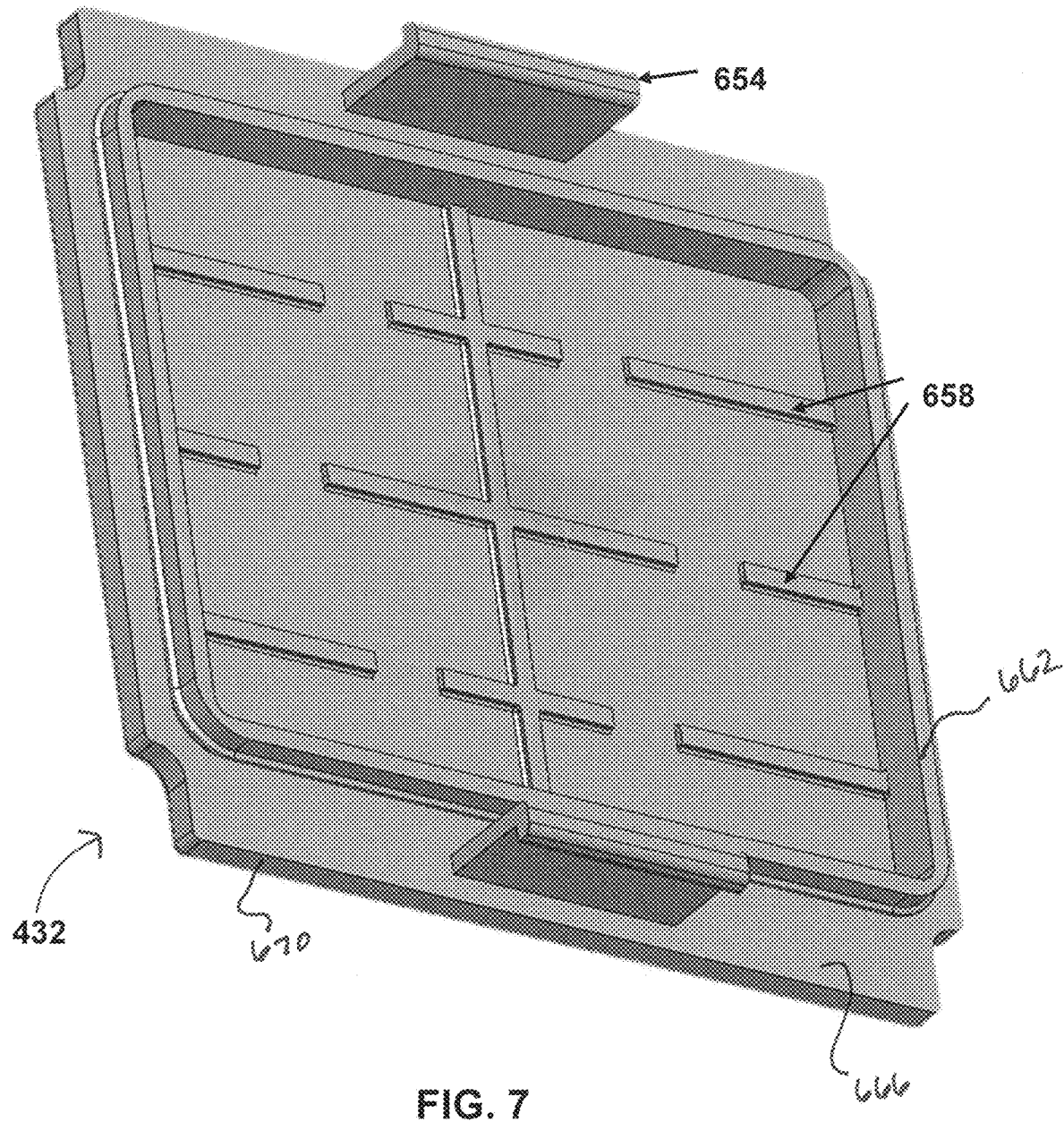
FIG. 7 is one embodiment of a bottom cover.

FIGS. 4A-D are different views of a pipe stem portion 428 for the threaded flow meter 400 of FIGS. 2A-C. FIG. 4A is a side view of the pipe stem portion 428 where the top of the pipe stem portion 428 is oriented upwardly and the bottom of the pipe stem portion 428 is oriented downwardly. The pipe stem portion 428 has upwardly extending members 512 extending upwardly from the top of the pipe stem portion 428. The through hole 520 for the fluid to flow through is seen in FIG. 4A. FIG. 4B is a bottom perspective view of the pipe stem portion 428. The end 420 where fluid enters (i.e., inlet) is on the left and the end 424 where fluid exits (i.e., outlet) is on the right with the flow direction arrow 402 showing the direction of the fluid flow. The bottom portion of the pipe stem portion 428 includes flow openings 504, housing interconnection portions 508 around the flow openings 504, apertures 512 to interconnect the housing, an inner edge 536, an interior perimeter wall 532, and corner supports 528. The bottom portion can also include slots 524 for engaging L-shaped arms of the bottom cover (FIG. 7). FIG. 4C is a top perspective view of the pipe stem portion 428.

Figure 4D:
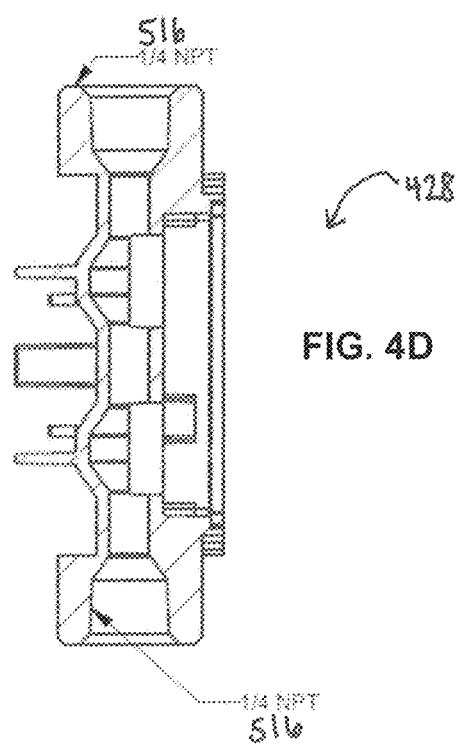

The upwardly extending members 516 are visible in this view. Both ends 420, 424 have internal threads 412 for interconnecting the pipe stem portion 428 to the fluid flow line. FIG. 4D is a side view of the pipe stem portion.

In some embodiments, the electrical internal components of the flow meter 400 (e.g., a circuit board with a processor, software, communication components and/or interface, and a power source (e.g., battery)) are placed above the pipe stem portion 428 and below the top cover 404. In one embodiment, the flow sensors are also above the pipe stem portion 428 and below the top cover 404. Here, the flow sensors may be located on upwardly extending portions 516 of the pipe stem portion 428. In alternative embodiments, the flow sensors are positioned below the pipe stem portion 428 and above the bottom cover. Here, the flow sensors may be in the extension portion 562 of the cover or in the holder 600, which is then positioned in the cavity 574 of the extension portion 562 of the cover. The flow sensors may be battery-powered in some embodiments and may be interconnected to the communication components and/or circuit board. The processor can control the communication components and/or interface such that the communication components and/or interface communicate to the operator's device (e.g., tablet, smart phone, computer, etc.) over the communication network, which is a wireless network in some embodiments.

Figure 5A:
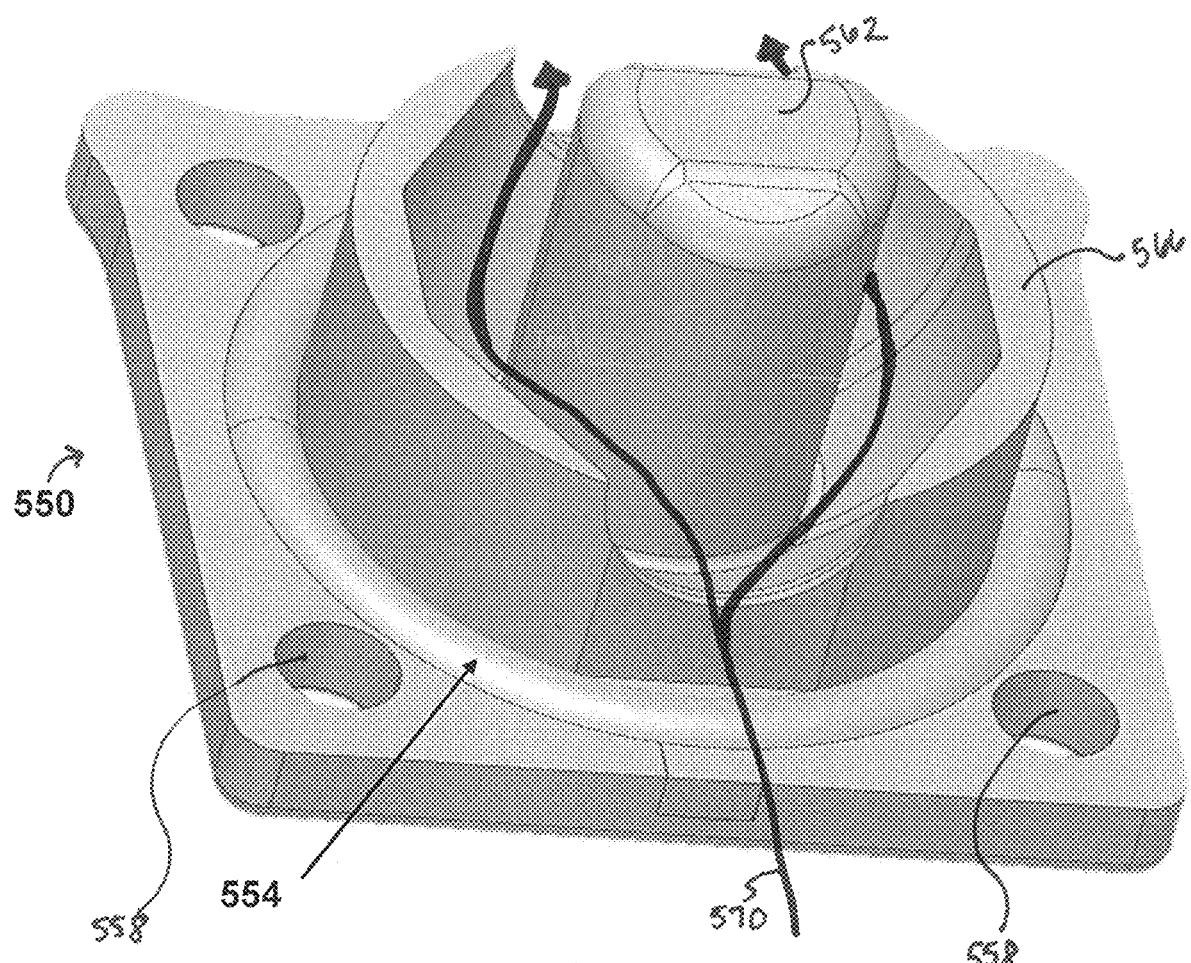
FIGS. 5A-C are different views of a housing.
Figure 5B:
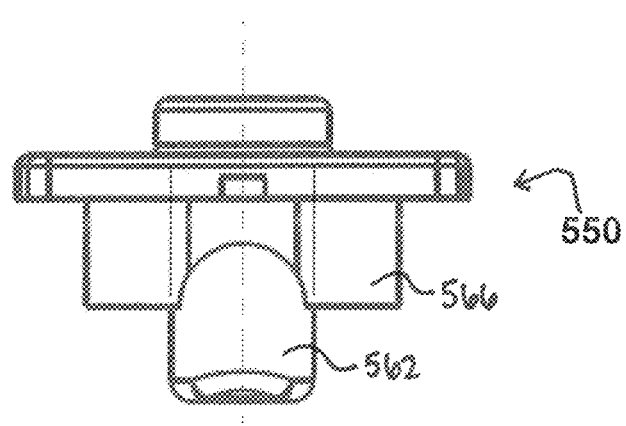
Figure 5C:
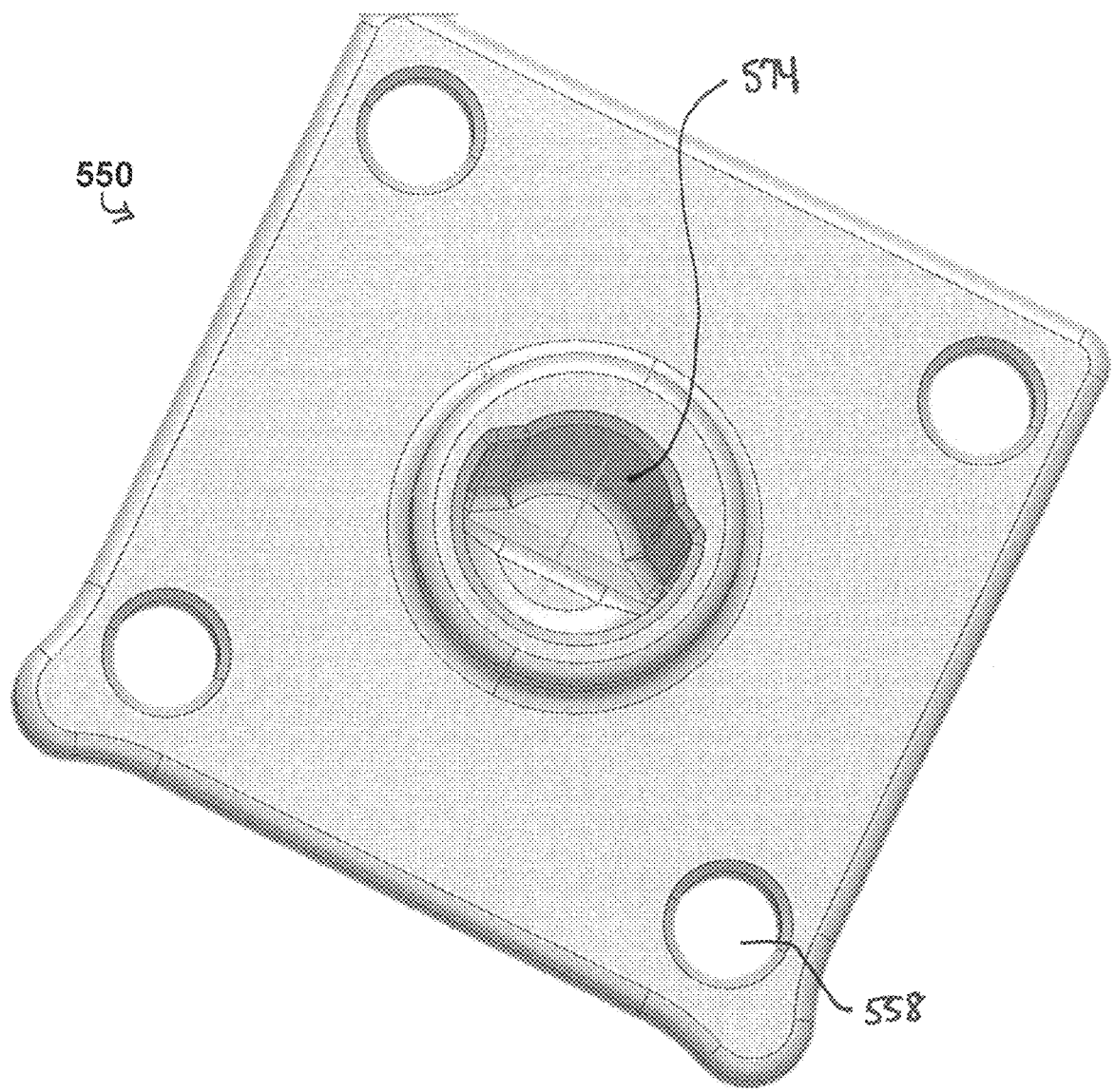

FIGS. 5A-C are different views of a housing 550. FIG. 5A is a top perspective view of the housing 550. The housing 550 has a gasket 554 to ensure a tight fit with the pipe stem portion 428 and apertures 558 that align with the apertures 512 of the pipe stem portion 428. The housing covers the bottom side of the flow opening 504 in the pipe stem portion 428. The housing 550 also has an extension portion 562 that extends into the fluid flow. The fluid flows along the path 570 and around the extension portion 562. The extension portion 562 includes a flow sensor to sense the amount of flow (flow rate) through the flow meter (i.e., through the pipe stem portion 428). The housing 566 includes a round portion 566 that fits snugly (friction fit) in the flow opening 504 of the pipe stem portion 428. FIG. 5B is a side view of the housing 550 and the top of the housing 550 is pointed downward and the bottom of the housing 550 is pointed upward. FIG. 5C is a bottom perspective view of the housing 550. The extension portion 562 has a cavity 574 into which the holder (FIG. 6A) fits.

Figure 6A:
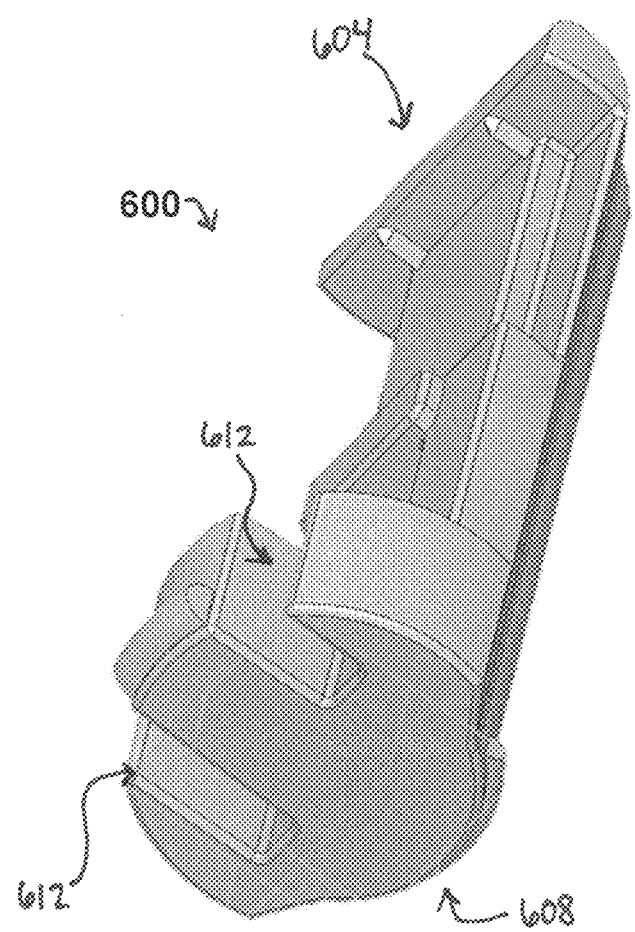
FIGS. 6A-B show one embodiment of a holder for a flow sensor.
Figure 6B:
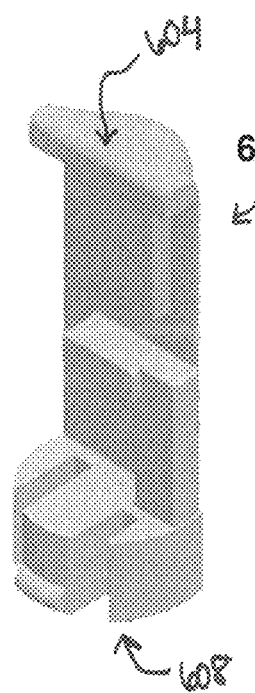

FIGS. 6A-B show one embodiment of a holder 600 for a flow sensor. FIG. 6A is a bottom perspective view of the holder 600 and FIG. 6B is a front perspective view of the holder 600. The holder has an upper end 604 and lower end 608. The lower end 608 has grooves 612. In some embodiments, the flow sensor is positioned within the holder 600.

FIG. 7 is top perspective view of a bottom cover 432. The bottom cover 432 interconnects to the bottom portion of the pipe stem portion 428. The bottom cover has upwardly extending arms 654 (which are L-shaped in some embodiments and other shapes in other embodiments) that extend upwardly from the top surface 666 and engage (e.g., snappingly fit) with the pipe stem portion 428. The arms 654 may also fit into slots 524 of the pipe stem portion 428. The top surface 666 of the bottom cover includes upwardly extending arms 654, an upwardly extending perimeter wall 662, and raised portions 658. The perimeter wall 662 is positioned inwardly from the outer perimeter edge 670 of the bottom cover 432. When the bottom cover 432 is interconnected to the pipe stem portion 428, the outer perimeter edge 670 is positioned adjacent to and inner edge 536 of the pipe stem portion 428, the arms 654 are positioned in the slots 520 of the pipe stem portion 428, the outer surface of the perimeter wall 662 is positioned adjacent to the interior perimeter wall 532 of the pipe stem portion 428, and the top surface of the perimeter wall 662 is positioned adjacent to the top surfaces of the corner supports 528 of the pipe stem portion 428.

Figure 8A:
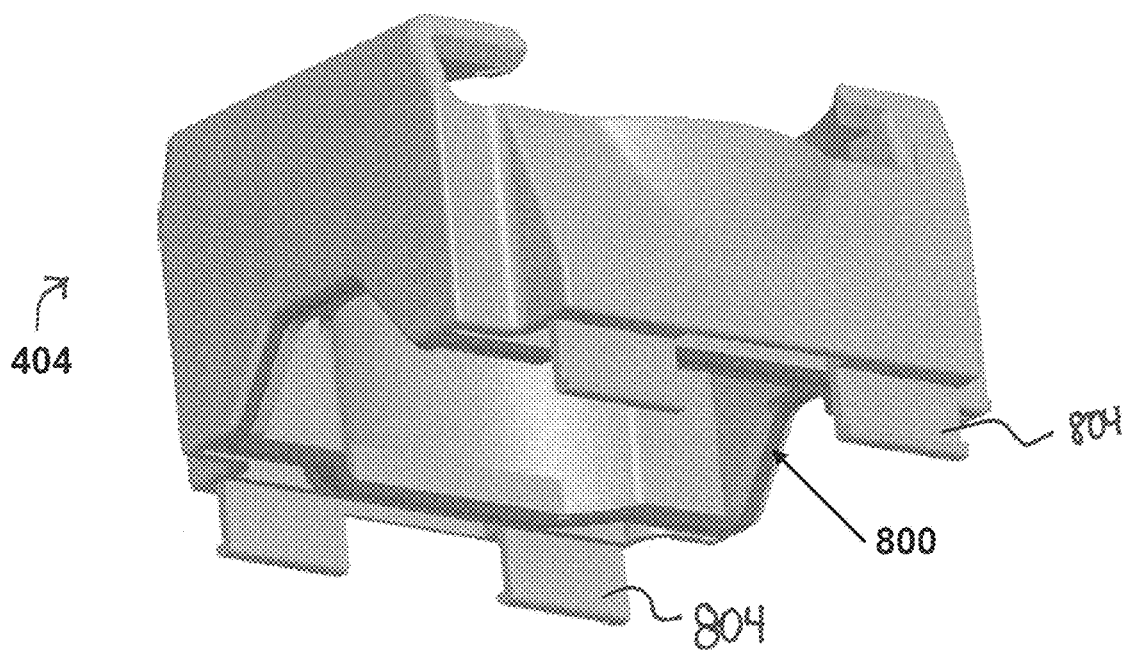
FIGS. 8A-8B are one embodiment of a top cover.
Figure 8B:
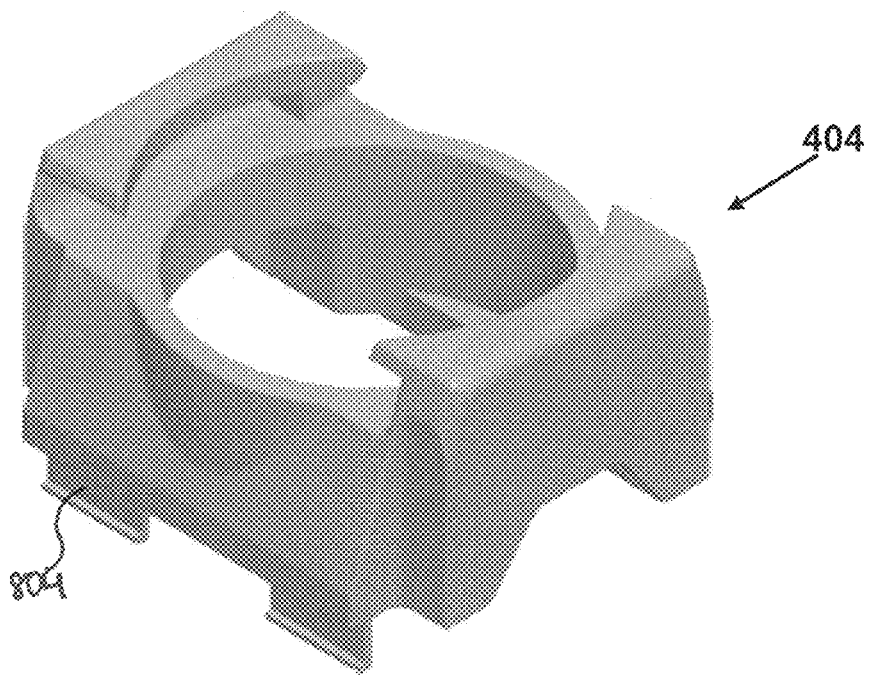

FIGS. 8A-8B show one embodiment of a top cover 404. FIG. 8A is a front bottom perspective view of the top cover 404 and FIG. 8B is a top perspective view of the top cover 404. In one embodiment, the top cover 404 has two downwardly extending arms 804 on the front and two downwardly extending arms of the back of the top cover 404. Other embodiments can include more or fewer arms 804, differently shaped arms 804, and arms 804 positioned in different locations. The arms 804 extend downwardly from the bottom surface of the top cover 404. The arms 804 fit into slots 524 of the pipe stem portion 428 to interconnect the top cover 404 to the pipe stem portion 428. In some embodiments, the arms 804 are L-shaped and engage (e.g., snappingly fit) with the pipe stem portion 428. In other embodiments, the arms 804 are other shapes. The top cover 404 includes a gasket 800 that extends around the bottom surface of the top cover 404. The gasket 800 ensures a tight and secure fit with the pipe stem portion 428.

Figure 9A:
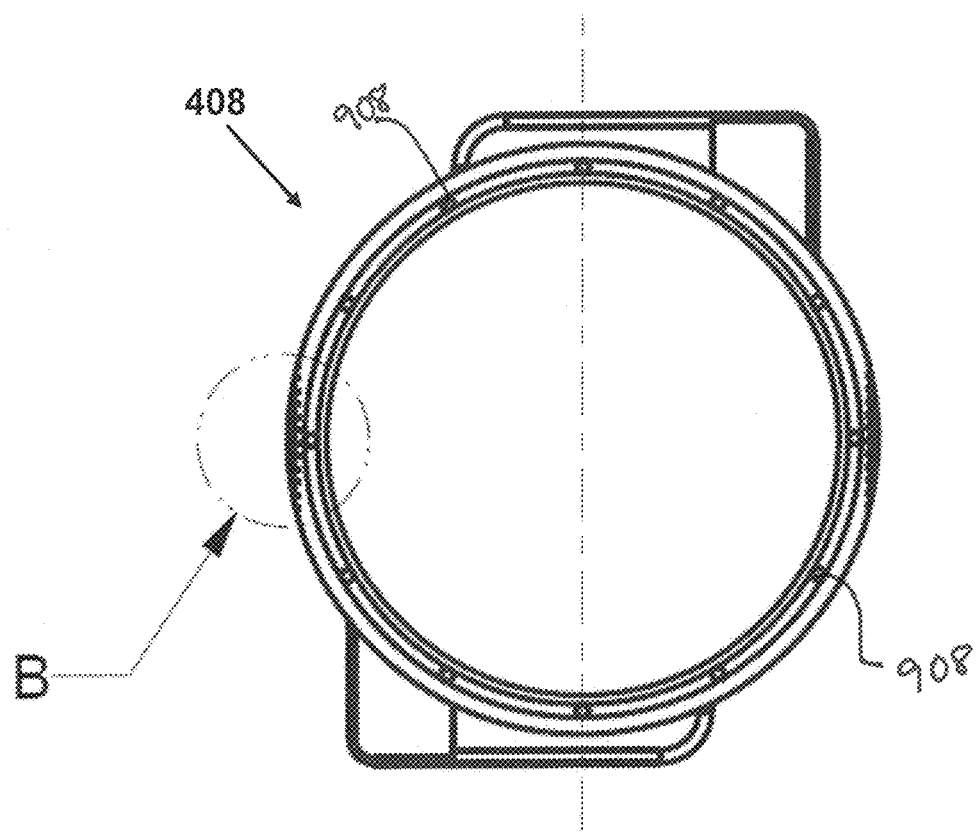
FIGS. 9A-D are one embodiment of a lid and gasket.
Figure 9B:
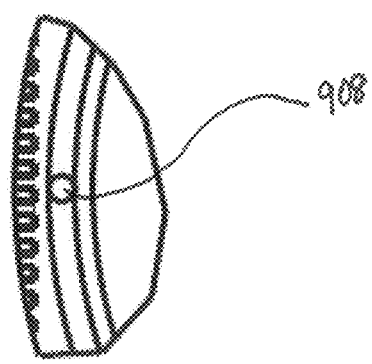
Figure 9C:
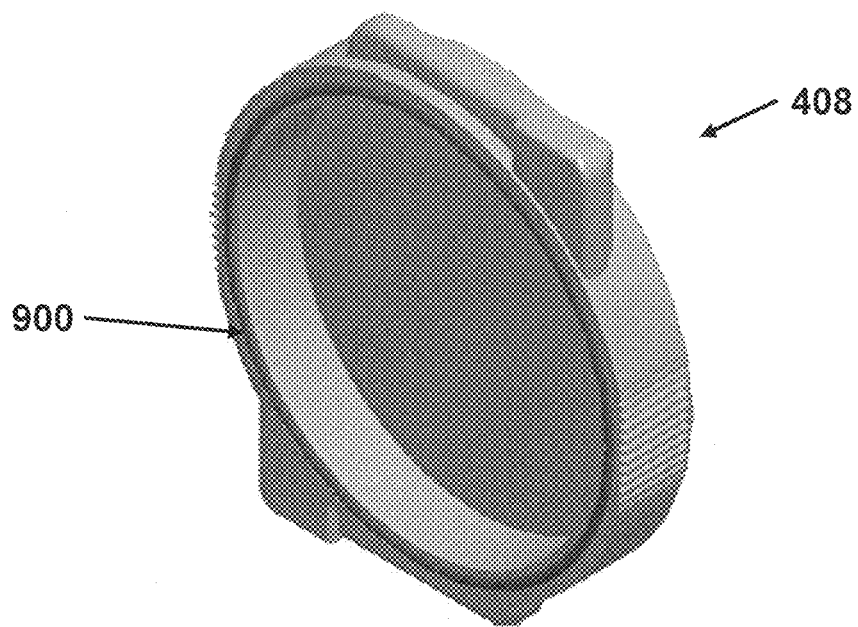
Figure 9D:
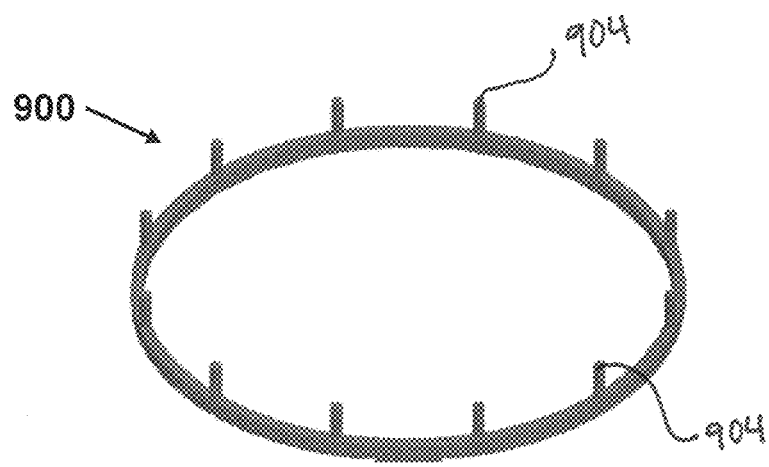

FIGS. 9A-D show one embodiment of a lid 408 and gasket 900. FIG. 9A is a bottom plan view and FIG. 9C is a bottom perspective view. The lid 408 is shaped to fit into the upper portion of the top cover 404. The gasket 900 is shaped to fit into a groove in the lid 408 and the gasket has upwardly extending portions 904 that fit into apertures 908 in the underside of the lid 408.

Figure 10:
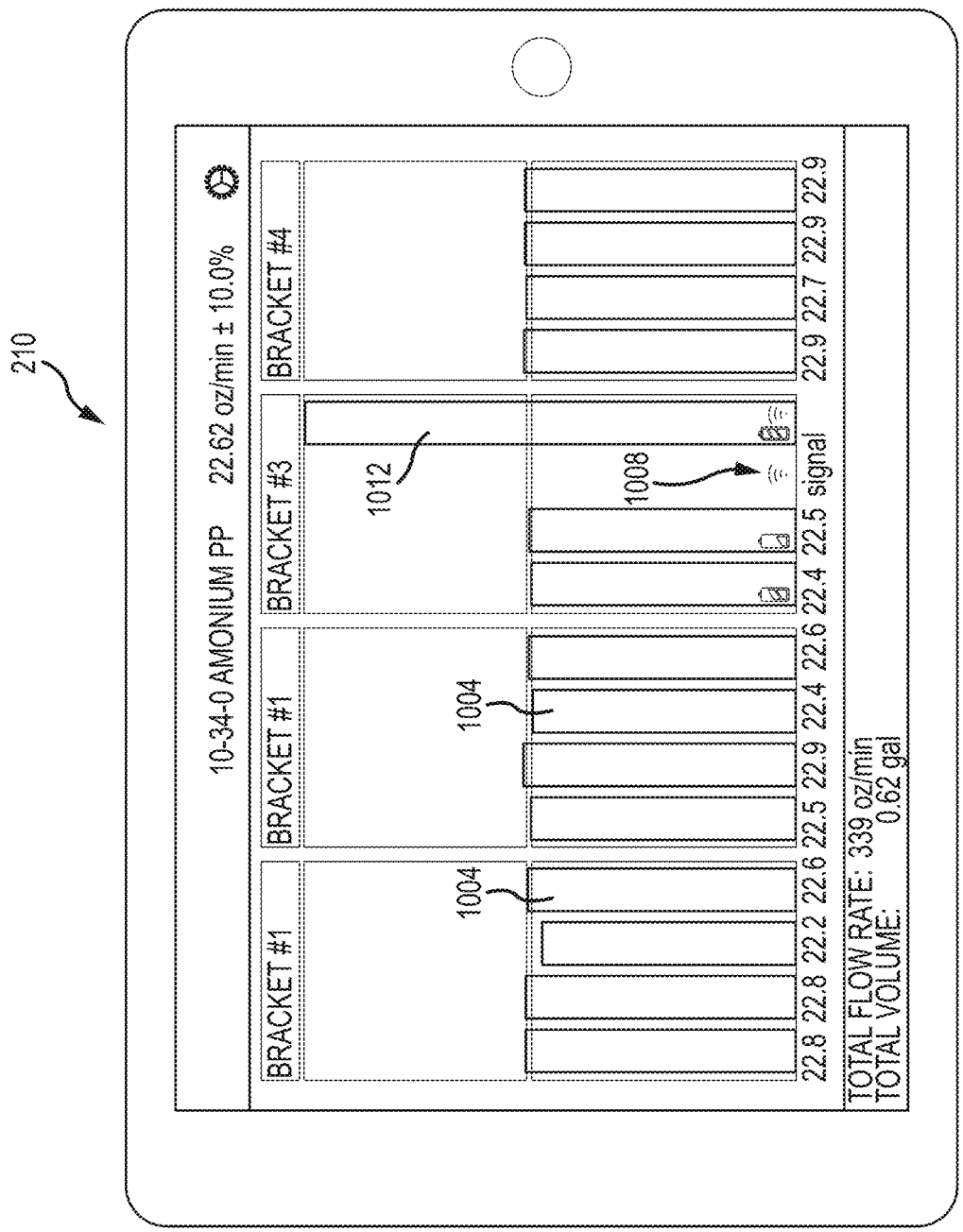
FIG. 10 is a screenshot of a command application.

FIG. 10 is a screenshot of one embodiment of a command application GUI 210. The command application GUI 210 shows the status of each flow meter. Each bar 1004 (green, yellow, etc.) represents one flow meter on one tube with fluid flowing to one row of crops or seeds. Each "bracket" on the GUI 210 represents a manifold with two or more (typically four) tubes delivering fluid to the rows of crops or seeds. Typically, each bar 1004 represents one row of crops or seeds. The number below the bar 1004 shows the flow rate for that row/tube/flow meter. The flow rate can be shown in ounces per minute (oz/min), milliliters per minute (mL/min), gallons per hour (G/hr), or other desired units. The top of the GUI shows the type of fertilizer or chemical that is currently being used. Here, 10-34-0 Amonium PP is the fertilizer used. The command application also can include a selection of various liquids an operator may use with a calibration curve for each liquid. Thus, the operator could calibrate the flow meters and for the current fluid while in the field. If the command application is not connected with a flow meter or sensor, then there will not be a green bar and a red signal design and the word "signal" in red 1008 will be shown. If no flow is registering, then the bar will be yellow 1012. The amount of battery remaining for each flow meter is also displayed in some situations. Each flow meter reports its battery status to the command application.

Figure 11:
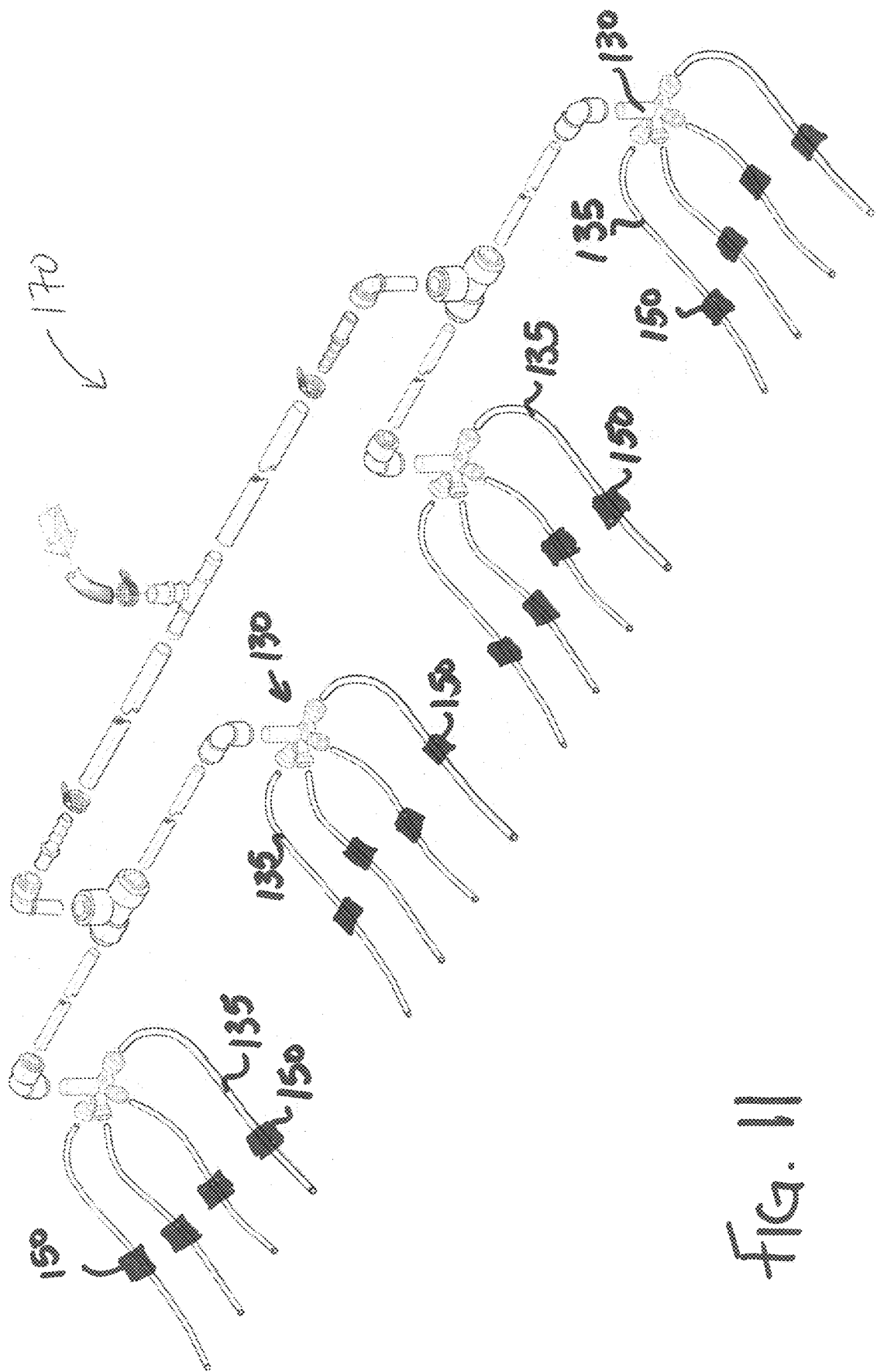
FIG. 11 is one embodiment of the tubing system.

FIG. 11 is one embodiment of the tubing system 170. The tubing system 170 includes various connectors, elbows, piping, manifold 130, feed lines 135, and a flow meter 150 on each feed line 135.

Figure 12:
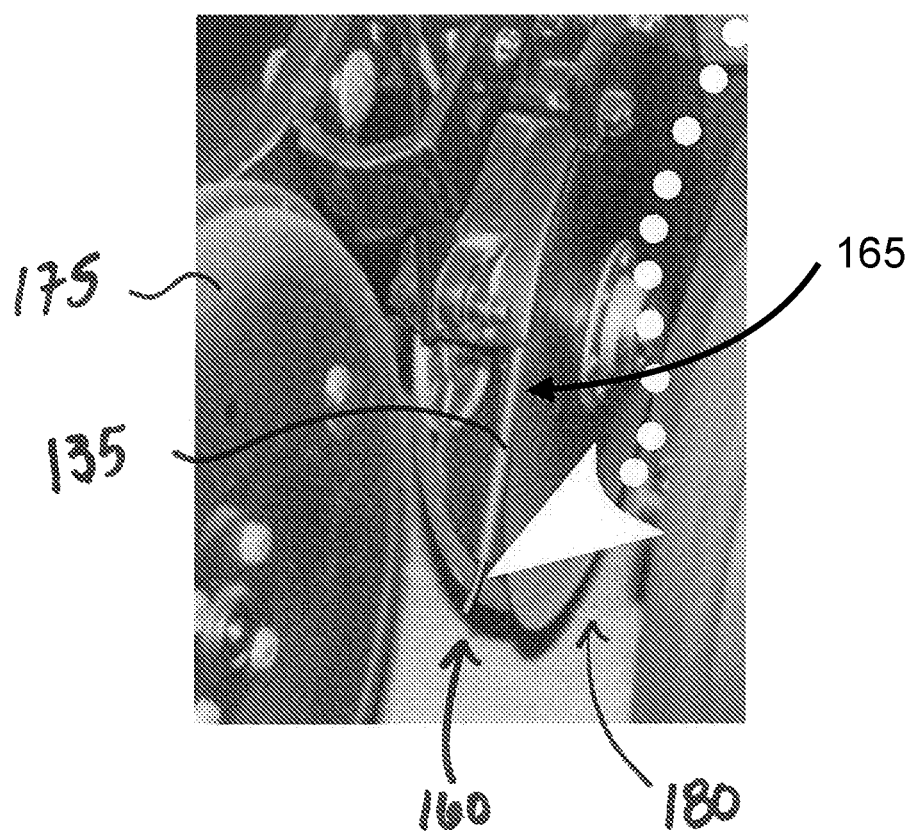
FIG. 12 shows the end of a tube interconnected to a planter and positioned proximate to a double disk opener.

FIG. 12 shows the end of a feed line 135 (outlet 160) interconnected to a planter and positioned proximate to a double disk opener 180 (two disks that open the ground to plant seeds in the opened ground). The tube of the feed line 135 is encased in a steel row tube bracket 165, which guides the tube between the two disks of the double disk opener 180 to position the outlet 160 over the seeds in the ground. The outlet 160 is also positioned behind a press wheel or seed firmer 175.

In one embodiment, a vibration-powered generator is employed, i.e., a transducer that converts kinetic energy derived from ambient vibration to electrical energy. In one embodiment, one or more piezoelectric vibration energy harvesters convert mechanical vibrational energy into alternating electrical energy (AC). This AC is then electronically converted to DC, which can be used to drive a multitude of wireless applications or recharge a battery, like the battery in each flow meter. Vibration energy harvesters can replace the need for batteries and costly battery maintenance to power these remote systems. For example, aspects disclosed in the aforementioned WIPO Patent Application WO/2012/011797 to Mohammad may provide some features of some embodiments of the invention. Alternatively, the battery in each flow meter may be recharged using solar chargers with solar thin film or other solar panel.

In one embodiment, one or more components or elements of the system, to include flow sensors, flow meters, valves, tanks, mixers, manifolds, flow outlets, GUI, power source, transmitters, receivers, transceivers and controllers, are attached or interconnected to farm or agricultural equipment by magnetic means, adhesives including adhesive mounting plates, ties, zip ties, clips, clamps, welding, metal wire, brackets, screws, or any means known to those skilled in the art.

One of ordinary skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, carbon fiber, ABS plastic, polyurethane, and other fiber-encased resinous materials, synthetic materials, polymers, and natural materials. The system and its elements could be flexible, semi-rigid, or rigid and made of materials such as stainless steel, titanium alloy, aluminum alloy, chromium alloy, and other metals or metal alloys, carbon fiber, ABS plastic, polyurethane, and other fiber-encased resinous materials, synthetic materials, polymers, and natural materials.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJS™ processors, and other industry-equivalent or future processors. The processors may perform computational functions using any known or future-developed standard, instruction set, libraries, and/or architecture.

The exemplary systems and methods of this disclosure have been described in relation to the remote charging of a device. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated secure, unsecured, and/or encrypted system. Thus, it should be appreciated, that the components of the system can be combined in to one or more devices, or collocated on a particular node/element of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a transceiver, an access point, a station, a management device, a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

A number of variations and modifications of the disclosure can be used. It would be possible to provide for some features of the disclosure without providing others.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, and the like.

The term "transceiver" as used herein can refer to any device that comprises hardware, software, circuitry, firmware, or any combination thereof and is capable of performing any of the methods, techniques and/or algorithms described herein.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced communications and power consumption reduction. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

One of ordinary skill in the art will appreciate that embodiments of the present disclosure, including as provided in FIGS. 1-12, may be used in applications other than soil farming. For example, in applications in which precise and reliable supply of liquid product are required. For example, to precisely and accurately deliver liquids during airborne chemical application (i.e., crop-dusting) and/or during airborne fire-fighting.

What is claimed is:

1. An agricultural liquid delivery system comprising:
   a tank;
   a manifold in fluid communication with the tank;
   piping interconnecting the tank to the manifold;
   two or more tubes interconnected to the manifold, wherein each tube has an outlet to deliver the agricultural liquid to a planting row;
   a wireless communication network;
   a plurality of wireless flow meters, wherein each tube is interconnected to a flow meter, wherein each wireless flow meter comprises a flow sensor, an outer housing, a battery, a processor, and a communication interface to connect to the wireless communication network; and
   a controller comprising a display, a graphical user interface, a processor, a power source, memory, and a communication interface to connect to the wireless communication network, wherein each flow meter is adapted to sense fluid flow through its corresponding tube and calculate the real-time fluid flow rate and send fluid flow rate information to the controller over the wireless communication network, wherein each flow meter is adapted to sense the status of its corresponding battery and send battery status information to the controller over the wireless communication network, and wherein the graphical user interface is adapted to continuously display on a single screen a graphical representation of each planting row associated with a wireless flow meter and the wireless transmission status, real-time fluid flow rate and battery status information for each of the plurality of wireless flow meters;
   a feed line interconnected to each wireless flow meter for delivery of agricultural liquid to the planting row; and
   a bracket interconnected to each feed line, wherein each bracket is adapted to position the feed line for delivery of the agricultural liquid to the planting row.

2. An agricultural liquid delivery system comprising:
   a first tank adapted to contain an agricultural liquid;
   a pump in fluid communication with the first tank;
   two or more tubes in fluid communication with the pump, wherein each tube is adapted to deliver an agricultural liquid;
   a wireless communication network;
   a plurality of wireless flow meters, each flow meter being associated with a planting row, wherein a wireless flow meter is interconnected to each tube, and wherein each wireless flow meter comprises a flow sensor, a battery, and a wireless communication interface for connection to the wireless communication network;
   a controller comprising a graphical user interface, a processor, memory, and a wireless communication interface for connection to the wireless communication network, wherein the controller is adapted to receive liquid flow and battery status information and display the liquid flow and battery status information on the graphical user interface; and
   wherein each flow meter is adapted to sense liquid flow through its corresponding tube and calculate the real-time fluid flow rate and to sense the status of is corresponding battery and to send liquid flow rate and battery status information to the controller over the wireless communication network for display on the graphical user interface; and
   wherein the processor calculates the real-time agricultural liquid flow rate, and wherein the graphical user interface is adapted to continuously display on a single screen a graphical representation of an arrangement of the plurality of wireless flow meters and the wireless transmission status, the real-time liquid flow rate for each planting row and the battery status for each of the plurality of wireless flow meters.

3. The invention of claim 2 wherein at least one flow meter further comprises a valve that is adapted to control the flow of the agricultural liquid.

4. The invention of claim 2, wherein the pump is interconnected to a wireless communication interface.

5. The invention of claim 2, wherein the power source is a battery.

6. The invention of claim 2, wherein each wireless flow meter further comprises a solar panel for recharging the corresponding battery.

7. The invention of claim 2, wherein the flow sensor is ultrasonic.

8. The invention of claim 2, wherein each flow meter further comprises a valve adapted to control the flow of liquid in the corresponding tube.

9. The invention of claim 2, further comprising a manifold in fluid communication with the pump and each tube.

10. The invention of claim 9, wherein the manifold further comprises a valve in fluid communication with each tube.

11. The invention of claim 2, further comprising a second tank adapted to contain an agricultural liquid, the second tank being in fluid communication with the pump.

12. The invention of claim 11, further comprising a third tank adapted to contain an agricultural liquid, the third tank being in fluid communication with the pump.

13. An agricultural liquid delivery system comprising:
    a first tank;
    a first pump in fluid communication with the first tank;

a first manifold in fluid communication with the first pump;

two or more tubes in fluid communication with the first manifold, wherein each tube is adapted to deliver an agricultural liquid;

a wireless communication network;

a wireless flow meter interconnected to each tube, wherein each wireless flow meter comprises a flow sensor, a battery, and a wireless communication interface;

a valve interconnected to each tube;

a feed line interconnected to each wireless flow meter, wherein each feed line is adapted to deliver agricultural liquid to the ground;

a bracket interconnected to each feed line, wherein each bracket is mounted to an agricultural implement, and wherein each bracket is adapted to position the feed line for delivery of agricultural liquid to the ground;

a controller comprising a processor and a wireless communication interface for connecting to the wireless communication network;

wherein each wireless flow meter is adapted to sense fluid flow through its corresponding tube and to sense the status of its corresponding battery and send fluid flow and battery status information to the controller through its wireless communication interface;

a graphical user interface adapted to continuously display in a single screen a graphical representation of an arrangement of a plurality of wireless flow meters and the wireless transmission status, fluid flow rate and battery status information for each wireless flow meter;

wherein each valve is adapted to receive control commands; and wherein the controller is adapted to send commands for independently controlling the liquid flow rate through each tube.

14. The invention of claim 13 wherein each valve further comprises a wireless communication interface for receiving commands from the controller.

15. The invention of claim 13 further comprising a second tank in fluid communication with the first pump.

16. The invention of claim 15 further comprising a mixer in fluid communication with the first and second tanks.

17. The invention of claim 16 further comprising a second pump in fluid communication with the mixer.

18. The invention of claim 17 further comprising a second manifold in fluid communication with the second pump.

19. The invention of claim 18 further comprising two or more tubes in fluid communication with the second manifold, wherein each tube is adapted to deliver an agricultural liquid.

20. The invention of claim 13 wherein the wireless communication network is selected from the group consisting of Bluetooth, near field communication, radio, WiFi, LTE, 4G, Bluetooth, WirelessHD, WiGig, WiGi, 3GPP, Wireless LAN, and WiMAX.

21. The invention of claim 1 wherein the bracket encases a portion of the feed line.

22. The invention of claim 1 wherein the bracket is comprised of steel.

\* \* \* \* \*